(12) United States Patent
Garanzha

(10) Patent No.: US 9,183,667 B2
(45) Date of Patent: Nov. 10, 2015

(54) OUT-OF-CORE RAY TRACING WITH MEMORY-EFFICIENT PAGE GENERATION

(76) Inventor: Kirill Garanzha, Moscow (RU)

( * ) Notice: Subject to any disclaimer, the term of this patent is extended or adjusted under 35 U.S.C. 154(b) by 623 days.

(21) Appl. No.: 13/549,668

(22) Filed: Jul. 16, 2012

(65) Prior Publication Data

US 2013/0016109 A1    Jan. 17, 2013

Related U.S. Application Data

(60) Provisional application No. 61/508,106, filed on Jul. 15, 2011.

(51) Int. Cl.
*G06T 15/06* (2011.01)
*G06F 12/08* (2006.01)

(52) U.S. Cl.
CPC ............ *G06T 15/06* (2013.01); *G06F 12/0897* (2013.01)

(58) Field of Classification Search
CPC ...... G06T 15/005; G06T 15/06; G06T 17/005

USPC .......... 345/419, 426, 501, 530, 544
See application file for complete search history.

(56) References Cited

U.S. PATENT DOCUMENTS

| | | | | |
|---|---|---|---|---|
| 5,818,456 A | * | 10/1998 | Cosman et al. | 345/614 |
| 2005/0122330 A1 | * | 6/2005 | Boyd et al. | 345/501 |
| 2009/0167763 A1 | * | 7/2009 | Waechter et al. | 345/426 |
| 2009/0292513 A1 | * | 11/2009 | Watte | 703/6 |
| 2010/0079451 A1 | * | 4/2010 | Zhou et al. | 345/420 |
| 2011/0285710 A1 | * | 11/2011 | Mejdrich et al. | 345/426 |
| 2012/0081368 A1 | * | 4/2012 | Park et al. | 345/426 |
| 2012/0206455 A1 | * | 8/2012 | Shreiner | 345/420 |

* cited by examiner

*Primary Examiner* — Joni Richer
(74) *Attorney, Agent, or Firm* — McClure, Qualey & Rodack, LLP

(57) ABSTRACT

In one embodiment, a method comprising grouping by a processor primitives that comprise a scene into plural clusters, each cluster comprising a subset of the primitives that are proximal to each other relative to the other of the primitives; and allocating an equal size memory block for each respective cluster for the plural clusters, wherein all the plural clusters comprise one scene representation, wherein each cluster can contain up to M primitives, where M is an integer number.

25 Claims, 15 Drawing Sheets

OUT-OF-CORE RAY TRACING WITH MEMORY-EFFICIENT PAGE GENERATION

CROSS-REFERENCE TO RELATED APPLICATION

This application claims priority to U.S. provisional application entitled, "Simple Out-of-Core Ray Tracing on Memory Limited Throughput Architectures with a Memory-Efficient Page Generation," having Ser. No. 61/508,106, filed Jul. 15, 2011, which is entirely incorporated herein by reference.

TECHNICAL FIELD

The present disclosure is generally related to graphics processing.

BACKGROUND

Scenes for feature film rendering and visualization have large geometric complexity and can easily contain anywhere from millions to several billions of polygons (or other primitives such as voxels of curved surface patches). Demands for greater photorealism, more realistic materials, complex lighting and global illumination push computational bounds which often result in long render times and out-of-core data access even on large systems.

SUMMARY

In one embodiment, a method comprising grouping by a processor primitives that comprise a scene into plural clusters, each cluster comprising a subset of the primitives that are proximal to each other relative to the other of the primitives; and allocating an equal size memory block for each respective cluster for the plural clusters, wherein all the plural clusters comprise one scene representation, wherein each cluster can contain up to M primitives, where M is an integer number.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
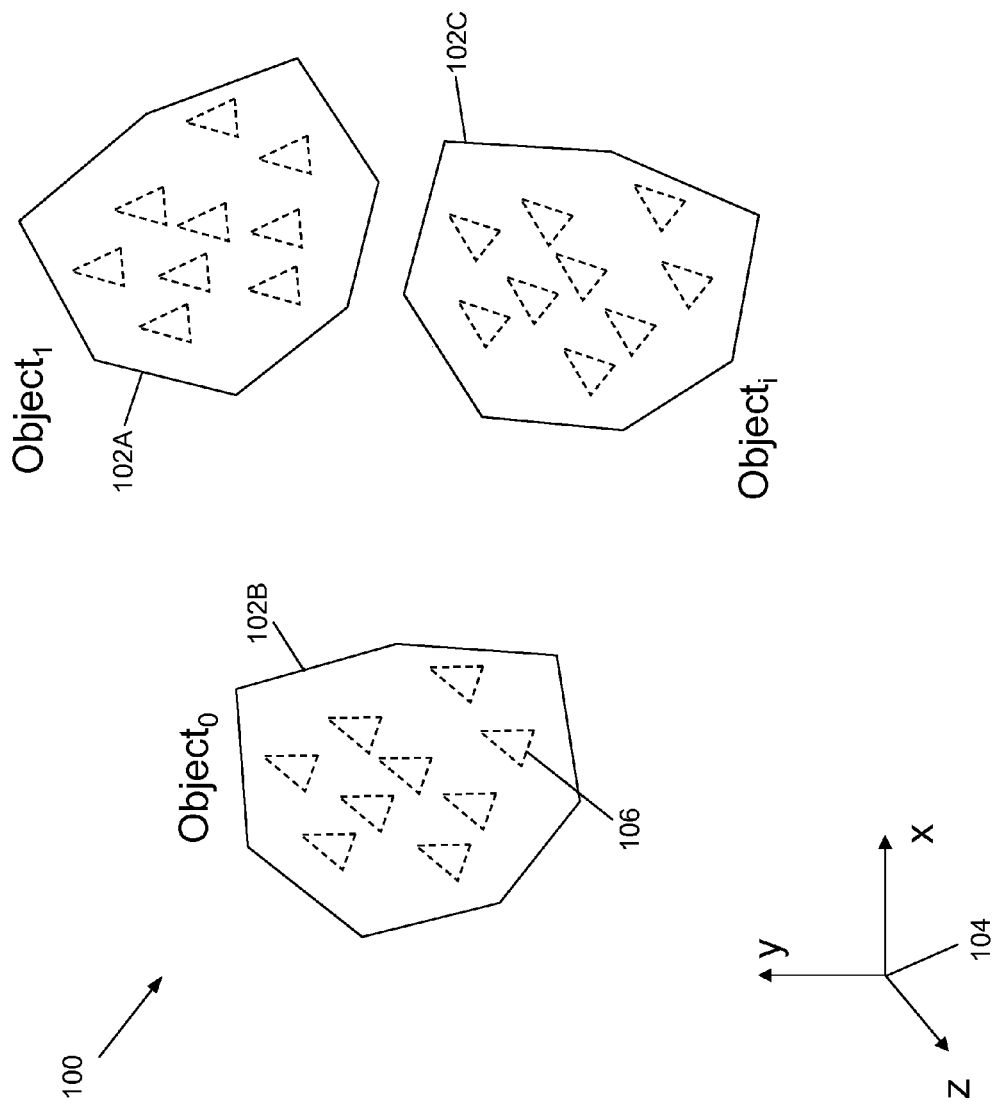
FIG. 1 is a schematic diagram that illustrates a basic scene representation operated upon by an embodiment of a graphics processing system.

Disclosed herein are certain embodiments of an invention involving graphics processing systems and methods that include an out-of-core ray tracing engine for rendering complex scenes on parallel architectures with limited memory. In some embodiments, a domain-specific memory cache is used that enables efficient access of out-of-core data. In some embodiments, a ray intersection algorithm is used that enables efficient rendering of complex scenes and that is built around an acceleration structure that brings needed data on demand using page-swapping. The ray tracing engine may be used to implement a variety of rendering and light transport algorithms.

Digressing briefly, for rendering or large dataset processing, a common practice is to use programs running on central processing units (CPUs). Modern CPUs may have several (e.g., 4-16) compute cores, and system motherboards may support up to 100 or 200 gigabytes (GB) of double data rate (DDR) memory (e.g., DDR3), which provides fast access to geometry data (e.g., faster when compared to, for instance, access to a disk).

Many areas of computer graphics, including film rendering, physical simulation, visualization and interactive rendering, etc., are rapidly impacted by the computational power and programmability of modern throughput architectures commonly available in today's graphics hardware (e.g., Graphics Processing Unit, GPU). Rendering and simulation applications that were considered strictly offline are becoming more interactive on throughput architectures primarily due to faster computation speeds (e.g., 10-20 times faster) and higher memory bandwidth in comparison to traditional CPU architectures. Unfortunately, the amount of available physical memory on modern GPUs is an order of magnitude smaller than on standard multi-core CPUs.

Ray tracing is becoming a popular alternative to traditional rasterization and micropolygon-based renderers in film production due to increased demand for global illumination, image-based lighting, reduced number of rendering passes and often simpler workflow. Efficient ray tracing requires an entire scene to be in memory, which poses a great challenge for ray tracing of complex scenes.

Current rendering tools that support large geometry datasets (e.g., with tens or hundreds of gigabytes of geometry data) provide a possibility to render preview image frames or high-quality final images, which may be rendered using ray tracing and executed on the CPUs. For instance, a 3D-artist may use this rendering tool to design an engineering product or a movie/film character or scene. On a typical desktop computer with a powerful CPU, a single image for such large scenes may be rendered in a few minutes for preview-image mode; or in a few hours for final image rendering. Depending on the skills of the 3D-artist, the movie or designed project may be delivered within a long time. The image of a large scene is rendered for a long time, and only then may the artist see any visual result and check for geometry output errors or global illumination setup. Any potential changes in a scene may require rendering the image again to see a desired result. The iterations of these modifications in a three-dimensional (3D) scene may postpone the production date of the final image because, for instance, any modification may require waiting for a long time.

Certain embodiments of graphics processing systems are disclosed that provide one or more high-throughput ray tracing solutions for large scenes (e.g., composed of tens or hundreds of gigabytes of geometry data). In one embodiment, a ray tracing solution is provided that simulates light optics effects and provides a tool of photorealistic rendering. Certain embodiments of graphics processing systems use widespread GPUs as a processor to solve various tasks.

One challenge may involve determining how to process large scenes, which contain tens and hundreds of gigabytes of data, on a GPU processor. Although a GPU provides a high-performance (1-5 terraflops or TFlops), parallel computation of small sub-tasks that solve a larger task, modern GPUs have an on-board memory of only 1-6 GB capacity, no virtual memory manager (an example of virtual memory manager is a system which may allow access to very large portions of data within the single parallel program), and slow data transfer rates (example 6 GB/sec) between a host processor memory (e.g., external central processing unit (CPU) memory) and a GPU device (e.g., on-board GPU memory).

In contrast, certain embodiments of graphics processing systems are described herein where ray tracing tasks or computations work on a memory limited GPU. If all the ray-primitive computations are done on the GPU, then the data to the GPU is delivered on demand and computations are performed with the data available on the GPU.

Some embodiments of a graphics processing system include a data structure of the scene geometry, where in one embodiment, the data structure is used to accelerate ray-primitive intersection search queries. Such a data structure is also referred to herein as an acceleration structure or spatial index. Hereafter, the terms acceleration structure or spatial index are used interchangeably (e.g., mean the same).

In some embodiments of a graphics processing system, many ray-primitive intersection queries may be assembled into a large group of queries. This group is submitted to the parallel processor GPU and all the queries are solved in parallel (e.g., each ray-primitive query is assigned to the single parallel thread). If geometry data that is necessary for ray-primitive intersection is in-core, the intersection is computed. If the data is out-of-core, the computation is postponed and an interrupt is prompted. When the computation for all the parallel threads is complete, the necessary data is delivered to the GPU memory and the computation resumes for all the parallel threads. Each thread is then either idle or involved in a search for ray-primitive intersections on the new geometry data, which is available now (but was missing on the previous invocation).

Certain embodiments of graphics processing systems comprise one or a combination of the following functionality: 1) Organization of an acceleration structure that is built as a hierarchy of pages. Proximal primitives of the scene may be grouped into clusters. A cluster refers to a group of a limited number of primitives that are as close to each other as possible in 3D space. Additionally, a supplemental acceleration structure is built over the cluster of primitives. A cluster of primitives and the supplemental acceleration structure determine a page. Hereafter, the terms page or geometry page are used interchangeably (e.g., mean the same). All the pages may be stored in equal size memory blocks, which may simplify page-swapping and/or transferring in a virtual memory manager. Emphasis is placed on the manner of page generation, which should be compact in 3D (e.g., to provide faster ray tracing). In one embodiment. the pages have the same memory storage size (e.g., to avoid memory fragmentation, increase memory utilization, etc.). 2) A defined order of computation (e.g., ray-intersection on in-core data) and page delivery. There may be many pages in the scene that should be delivered to the GPU for computation. In one embodiment, the most important pages are delivered first. This order results in a robust latency-hiding in a system comprising a parallel processor (such as a GPU) for which data should be delivered through a bus (e.g., PCI-Express bus) with low bandwidth.

Having summarized certain features of graphics processing systems of the present disclosure, reference is now made in detail to the description of the disclosure as illustrated in the drawings. While the disclosure is described in connection with these drawings, there is no intent to limit it to the embodiment or embodiments disclosed herein. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

There are a few terms used in the disclosure and identified below to assist in providing an understanding of certain embodiments of graphics processing systems. It should be appreciated that these terms are for illustration, and in some embodiments, not intended as limiting. A scene representation or geometry 100, such as shown in FIG. 1 according to a virtual memory organization of one graphics processing system embodiment, may comprise one or more objects 102 (e.g., 102A, 102B, 102C, etc.) in three-dimensional space, as represented by coordinate symbol 104. Each object 102 may comprise a shape or character that is composed of many (e.g., hundreds of millions or billions) primitives, such as scene primitive 106. A primitive 106 may be a polygon (triangle, as shown, or quad, etc.) or curved surface patch. As shown, all of the primitives 106 form the surfaces of the scene objects 102. Another kind of primitive may be a voxel, which has a volume, and which determines a body (e.g., volume or shape) of the scene object 102.

Ray tracing refers to a fundamental computation element for visibility queries used in computer graphics. For instance, assume points v1 and v2 in 3D space. The ray goes from v1 to v2. There is a motivation in graphics processing to find an intersection between this ray and the closest and/or any scene primitive (e.g., a ray-primitive intersection query). The presence of an intersected primitive has influence on the illumination of point v1 and has influence on applications where illumination of v1 makes sense.

Data is considered in-core when the data undergoes computation on a processor and resides on the memory unit closest to the processor. Data is considered out-of-core when there is a need to process the data, but the data is not stored on the closest memory that is accessible by the processor (and hence a motivation for delivering the data in-core).

A spatial-index (also referred to herein as an acceleration structure) comprises a data structure that is constructed by a processor over a dataset and used to accelerate access/requests to a data array in a given dimensionality. In 3D graphics, one of the commonly used examples of spatial-indices is often referred to as a bounding volume hierarchy (BVH). There are other types of spatial indices which are used in 3D graphics (such as kd-trees, BIH, grids, etc.). Hereafter, BVH (or acceleration structure) is used as one example of the spatial-index, among other possible examples of a spatial index, the others also contemplated to be within the scope of the disclosure. The term BVH is used herein to refer to a spatial-index.

Figure 2:
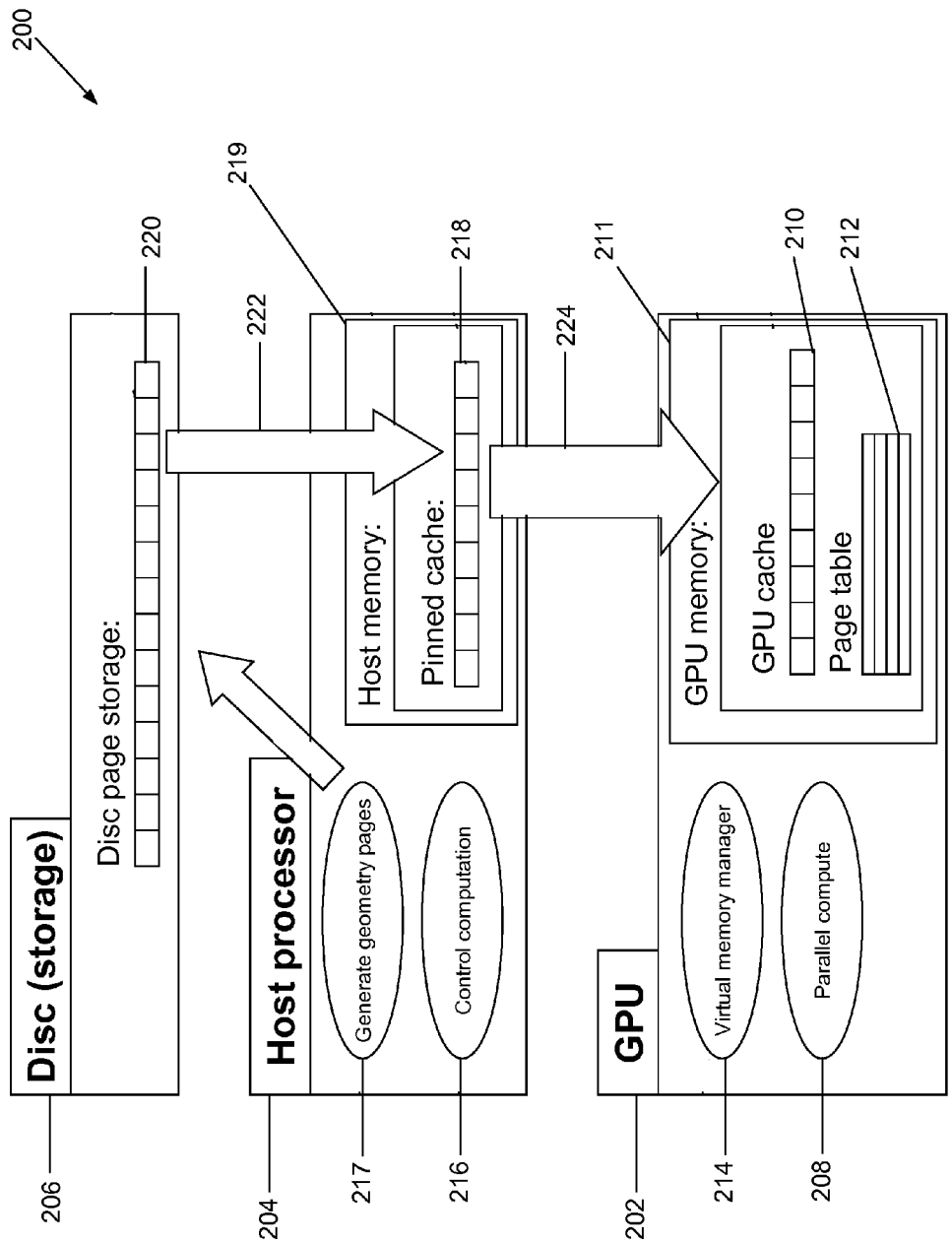
FIG. 2 is a schematic diagram of an example embodiment of a graphics processing system.

Attention is now directed to FIG. 2, which provides an illustration of one embodiment of a graphics processing system 200. One having ordinary skill in the art should appreciate in the context of the present disclosure that the architecture shown in FIG. 2 is for general, illustrative purposes, with other variations contemplated to be within the scope of the disclosure. In other words, it should be appreciated by those having ordinary skill in the art that a graphics processing system may have additional and/or different components than those shown in FIG. 2. The graphics processing system 200 comprises a GPU 202, a host processor (e.g., central processing unit or CPU) 204, and a computer readable medium, such as a disc 206. In some embodiments, the graphics processing system may comprise plural processors, or in some embodiments, a single processor (e.g., with functionality of the host processor and GPU). The GPU 202 and CPU 204 represent a hierarchy of processors in the graphics processing system 200, where the GPU executes parallel programs (such as ray tracing), and the CPU performs supplemental tasks and invokes GPU programs. Parallel programs executed by GPU 202 comprise parallel compute logic 208, and a virtual memory manager 214. The GPU 202 further comprises a GPU memory 211, wherein the GPU memory comprises a GPU cache 210 and a page table 212. The computational logic 208 computes ray primitive intersections utilizing the GPU cache 210. The GPU cache 210 comprises temporal storage of at least a portion of the geometry pages (pages are described below) that is transferred to the GPU cache 210 on demand. The GPU virtual memory manager 214 implements a page replacement policy and a page transfer order that may use the page table 212. The page table 212 comprises an encoded presence (e.g., counter, flag, etc.) of each geometry page in either GPU cache 210 or pinned cache 218 or disc storage 220. The CPU 204 comprises computational logic 216 (control computation) and 217 (generate geometry pages) and a host memory 219, wherein the host memory comprises a pinned cache 218. The CPU 204 invokes the parallel programs running on the GPU 202 via the computational logic 216 that controls the computations. The computational logic 217 generates geometry pages (in some embodiments page generation is implemented running on the GPU 202 using GPU resources comprising GPU memory 211) and saves the same to the disc 206. The disc 206 comprises a disc storage 220 that stores the whole scene geometry organized in pages. The pinned cache 218 comprises at least a portion of the geometry pages (e.g., bottom level BVH pages) that is transferred to the pinned cache 218 on demand. Demand driven page transfer is operated using a virtual memory manager 214 and parallel compute 208. In one embodiment, the pinned cache 218 cannot be swapped out of the host memory 219 by an operating system.

The graphics processing system 200 may be construed as including a hierarchy of memory. For instance, the disc 206 (or second memory or external memory) may be considered a cache level 3, which comprises a storage where all of the pages of a scene are stored. The pinned cache 218 may be viewed as a cache level 2, which comprises a cache allocated in the host processor memory 219, wherein the cache level 2 temporarily stores a portion of the pages from the cache level 3 (e.g., the disc 206). The GPU cache 210 may be viewed as a cache level 1, which comprises a cache allocated in the GPU memory 211, wherein the cache level 1 (e.g. the GPU cache 210) temporarily stores a portion of the pages from the cache level 2 (e.g. the pinned cache 218). Hereafter, data content which is stored in the cache level 1 in a given time is referred to as in-core data for the GPU 202, and the other data content, which is stored in cache levels 2 or 3, is referred to as out-of-core data. The cache levels 3 and 2 are directly connected by a data transfer bus 222 (e.g., 50 Mbytes/sec for SATA transfer, 500 Mbytes/sec for SSD transfer, etc.), which enables page transfer. The cache levels 2 and 1 are directly connected by a data transfer bus 224 (e.g., 6 GBytes/sec for PCI-Express—16 Generation 2), which also enables page transfer.

Figure 3:
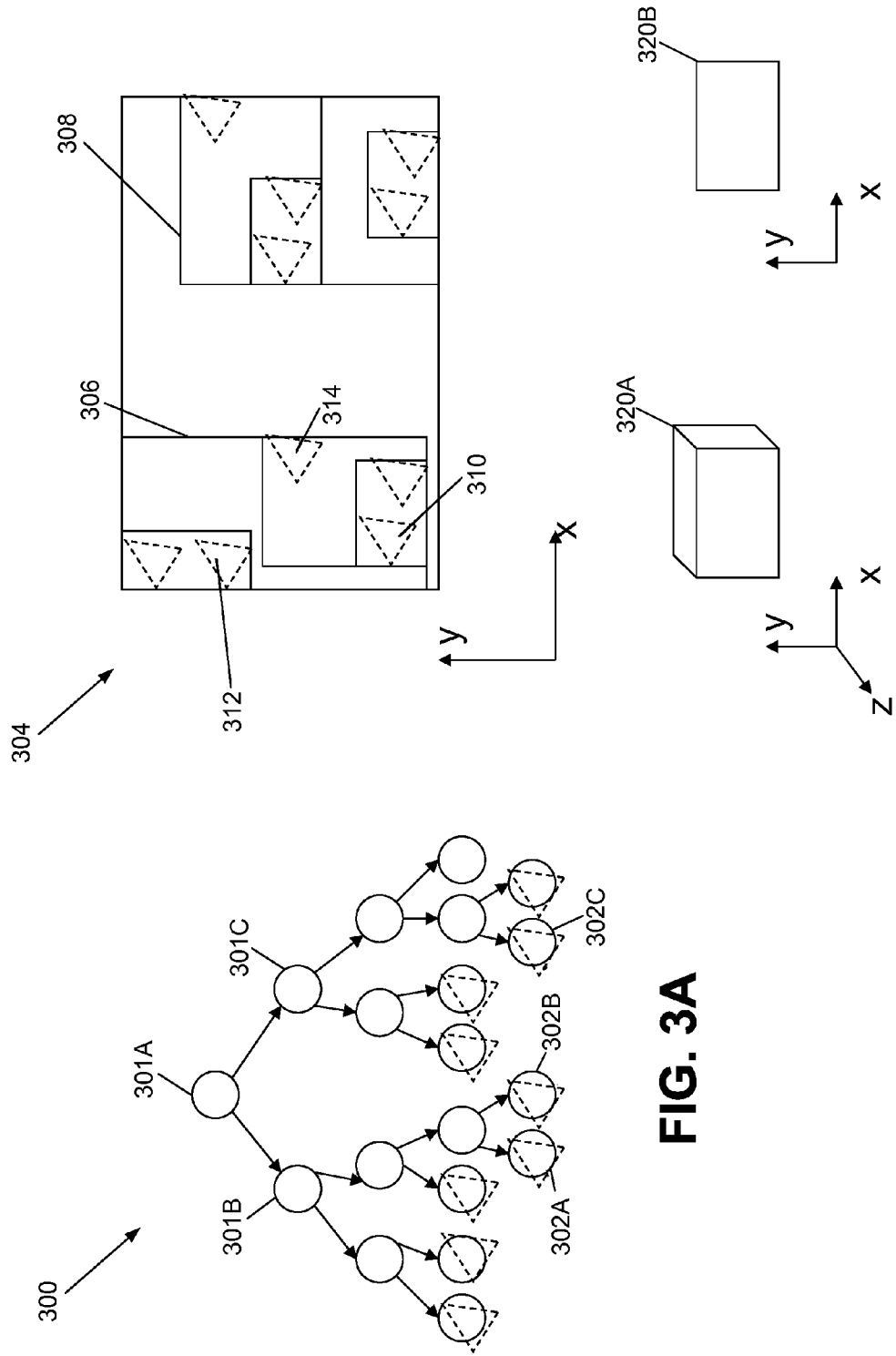
FIGS. 3A-3B are schematic diagrams that illustrate one example method by which an embodiment of a graphics processing system organizes geometry primitives.

In one embodiment of a graphics processing system, and as shown in FIG. 3A, the scene geometry primitives are organized in a binary hierarchy constructed using BVH 300 as one example of an acceleration structure (spatial index). It should be appreciated within the context of the present disclosure that other types of acceleration structures (such as kd-tree, grid, bounding interval hierarchy, etc.) may be used in some embodiments instead of BVH, the BVH being used as one example mechanism, among others, to accelerate the search of ray-primitive intersection. If the empty space is better culled/separated from the geometry, then the ray-primitive intersection may be found faster. The BVH 300 is the hierarchy of connected nodes 301A, 301B, 301C, 302A, etc. (with one root node 301A and many leaf nodes 302A, 302B, 302C). The example BVH 300 organizes the set of input primitives into the hierarchy of the primitive subsets (each subset corresponds to a node): the root node 301A unites all the primitives; within the scope of the root node the primitives are subdivided into 2 disjoint subsets of primitives (one subset is united under the first child-node 301B of root node, another subset is united under the second child-node 301C). The subsets of primitives are further recursively subdivided into smaller subsets within the scopes of corresponding parent nodes. The process of subdividing the subsets of primitives ends when each node of the BVH contains a reference to just one or a few primitives 302 (such ending nodes of the hierarchy are denoted as hierarchy leaves). Geometry primitives are organized in a hierarchy according to their spatial relationships. Referring to FIG. 3B, shown is a spatial representation 304 in a 2D projection of the BVH and the primitives grouped into disjoining subsets. In general, the idea of the BVH is to separate the groups (subsets) (e.g., 306, 308, etc.) of primitives from empty space as much as possible (these groups correspond to the BVH nodes 301B and 301C of the BVH). Each group 306 of primitives bounds the underlying primitives (e.g., 310, 312, and 314) with the axis-aligned boundary box AABB 320A (3D view) or 320B (2D view).

Figure 4:
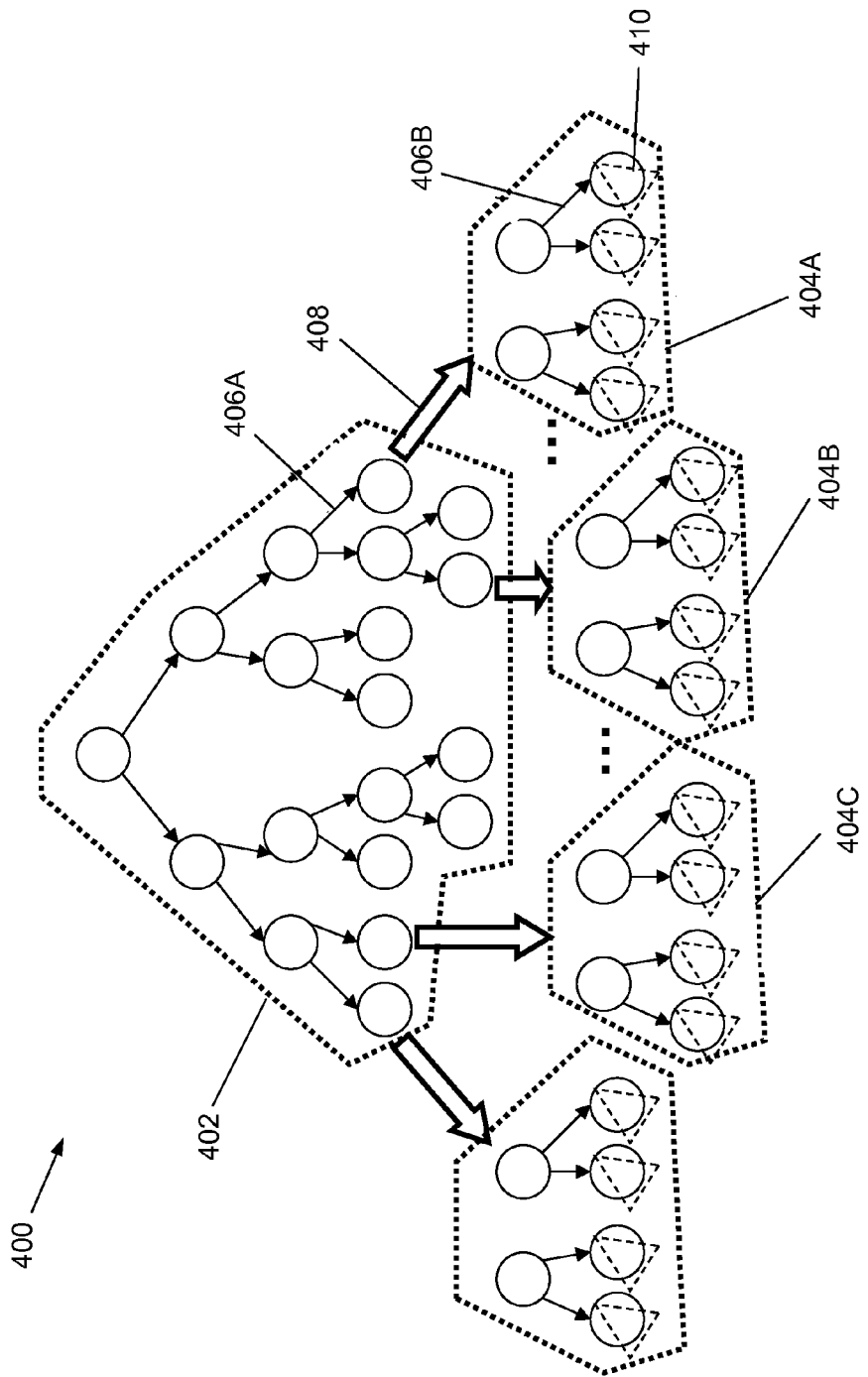
FIG. 4 is a schematic diagram that illustrates one example hierarchical arrangement of a spatial index employed by an embodiment of a graphics processing system.

FIG. 4 provides a hierarchical organization of an acceleration structure 400 (e.g., spatial index levels), including a top level 402 and a bottom level 404 (e.g., 404A, 404B, etc.). It is noted that the type of acceleration structure used in this example is a BVH. The BVH is built in consideration of a virtual memory environment. The bottom level BVHs 404A, 404B, 404C, etc. organize geometry primitives 410 (corresponding to scene primitives 106, FIG. 1) comprising all the primitives of the scene; each bottom level BVH is organized as the page (i.e. has a fixed size of its content). The top level BVH 402 organizes the representatives of the bottom level BVHs (within the scope of the top level BVH the bottom level BVH is represented with the axis-aligned bounding box, corresponding to 320A, FIG. 3). Note that, for purposes of illustration, the single-lined arrow 406 (406A, 406B) represents a node-to-child reference inside the single page 404 or a union of pages (e.g., top level) 402 and the double-lined arrow 408 represents a node-to-child reference in the acceleration structure (e.g., from a leaf of the top level BVH 402 to a root of the bottom level 404 of the BVH page).

In one embodiment, the acceleration structure has two major layers, including the bottom level pages 404 (also, bottom level BVH or bottom level BVH pages or geometry pages or the like) and the top level 402 (also top level BVH or the like). The bottom level 404 comprises the primitives of scene that is subdivided into clusters, where each cluster of primitives has a supplemental bottom-level acceleration structure/BVH. The bottom level page 404 comprises the BVH and the cluster of primitives. The top level 402 comprises a non-paged BVH which organizes the representatives assigned to the bottom level pages.

The top level 402 comprises a single BVH where every leaf has the reference to the root of the bottom level 404. The BVHs from the bottom level 404 are virtual, as they may be stored in different memory locations, including in cache level 3, (e.g., in external memory/disc, such as an SSD disc or SATA disc), in cache level 2 (e.g., in CPU Pinned Random Access Memory (RAM)), or in cache level 1 (e.g., in GPU memory, which is limited). The pinned memory of the CPU is not swapped-out by the Operating System, and hence typically limited with the capacity of the physical RAM memory. In one embodiment, a pinned CPU memory region is used because it provides a faster data transfer from CPU to GPU through the PCI-Express bus.

The bottom level 404 is organized in such a way that geometry primitives are separated from the empty space as much as possible (e.g., a Surface Area Heuristic, SAH, is used, such as described in V. Havran's PhD thesis "Heuristic Ray Shooting Algorithms"). Better separation from the empty space results in a more spatially efficient BVH. Space efficient BVHs may provide faster computation of search queries for ray-primitive intersections.

In one embodiment, the SAH heuristic is modified to generate the pages of a BVH. The BVH page has a fixed memory capacity (e.g. may contain up to PMAX nodes). One heuristic embodiment gives "memory efficient" BVH pages (e.g., almost all of the BVH pages contain PMAX nodes and only a few of the BVH pages may contain less than PMAX nodes) given that geometry data can be distributed arbitrarily sparsely in the 3D space. If only the SAH heuristic is used to generate all the BVH pages (e.g., with a maximum capacity of PMAX nodes per page), then the average number of nodes per BVH page is approximately equal to 0.6*PMAX. When implementing the memory efficient heuristic (MEH) heuristic, in contrast, the average number of nodes per BVH page is approximately equal to 0.97*PMAX, and less BVH pages are generated for the given set of primitives. This statistic is accumulated for various tested scenes.

One embodiment for generating memory efficient BVH pages is as follows: scene primitives are grouped into the clusters of proximal primitives in 3D; each cluster has a fixed capacity (e.g., a limited number of primitives which can be stored within the cluster); a BVH is constructed for each cluster; for a limited number M of primitives within a given cluster, the corresponding BVH has the limited number, PMAX, of nodes. A cluster and corresponding BVH, constructed for the cluster, is referred as a bottom level BVH (e.g., BottomLevel BVH) or page.

Figure 5:
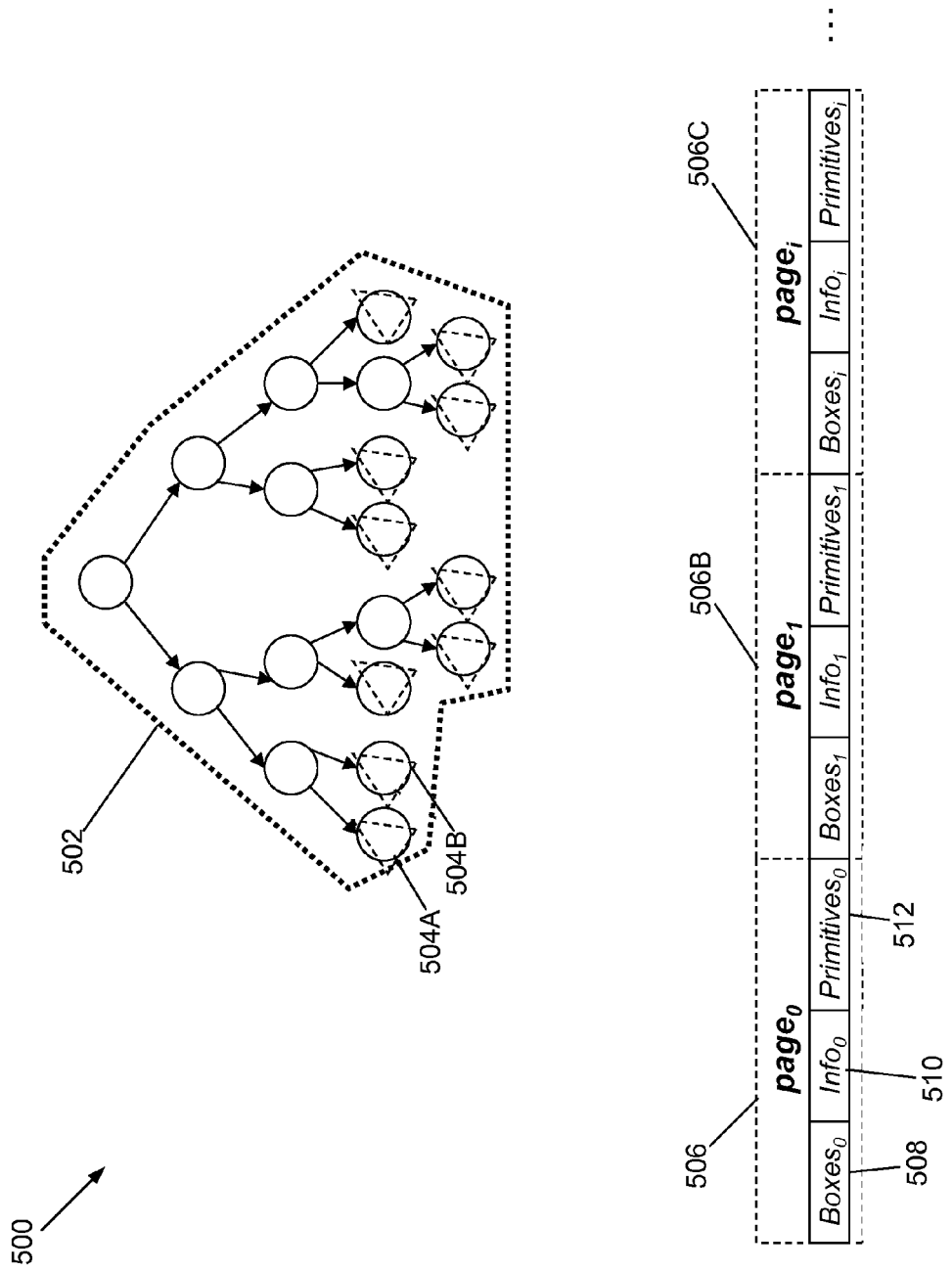
FIG. 5 is a schematic diagram that illustrates one example method for organizing an internal page as employed by an embodiment of a graphics processing system.

Referring now to FIG. 5, shown is further detail of BVH pages 500 comprising a bottom level BVH page 502. The bottom level BVH page 502 corresponds to bottom level 404 in FIG. 4. As shown, all of the bottom level BVH pages 502 have a fixed number of primitives that are organized into a binary bounding volume hierarchy (corresponds to BVH 300 in FIG. 3), where each subset of primitives is bounded by an axis-aligned bounding box AABB (corresponds to 3D AABB 320A, FIG. 3B). Each bottom level BVH 502 represents a page 506 in memory (i.e. has fixed size of content). The internal structure of each BVH page comprises the nodes comprising the fields of AABB "Boxes" 508 and information word "Info" 510. The bottom level BVH nodes reference to the lower level nodes within the same BVH or to the blocks of primitives 512 (corresponding to 504A, 504B, etc.). All the generated pages (506, 506B, 506C, etc.) are stored in disc storage 220 in FIG. 2, and a portion of pages are temporarily stored in pinned cache 218 and GPU cache 210.

The memory efficiency of the BVH page is important for the virtual memory manager, for instance, to utilize the memory as much as possible for the storage of valuable geometry data (e.g., store as much geometry elements (primitives or BVH nodes) as possible inside the memory region dedicated for the single page). Using such a method, only a few pages may contain unused memory segments.

Within a pre-allocated memory block, equal for each page, one segment of memory is utilized for data storage, such as primitives of the corresponding cluster and nodes of the corresponding bottom level BVH. Another segment within the memory block is not utilized. One target for using a memory efficient heuristic is to minimize the size of unused memory segments and hence the total number of generated pages for the given set of primitives. At the same time, resulting pages are "spatially efficient" because their corresponding clusters are spatially well separated from the other clusters (the primitives inside each cluster are spatially as proximal to each other as possible).

In one embodiment, the structure of the bottom page 502 may be configured according to the following pseudo code:

```
Struct BottomPage
{
    AABB * Boxes;
    Int * info;
    PRIM * Prims; // the array of all primitives page
}
```

Figure 6:
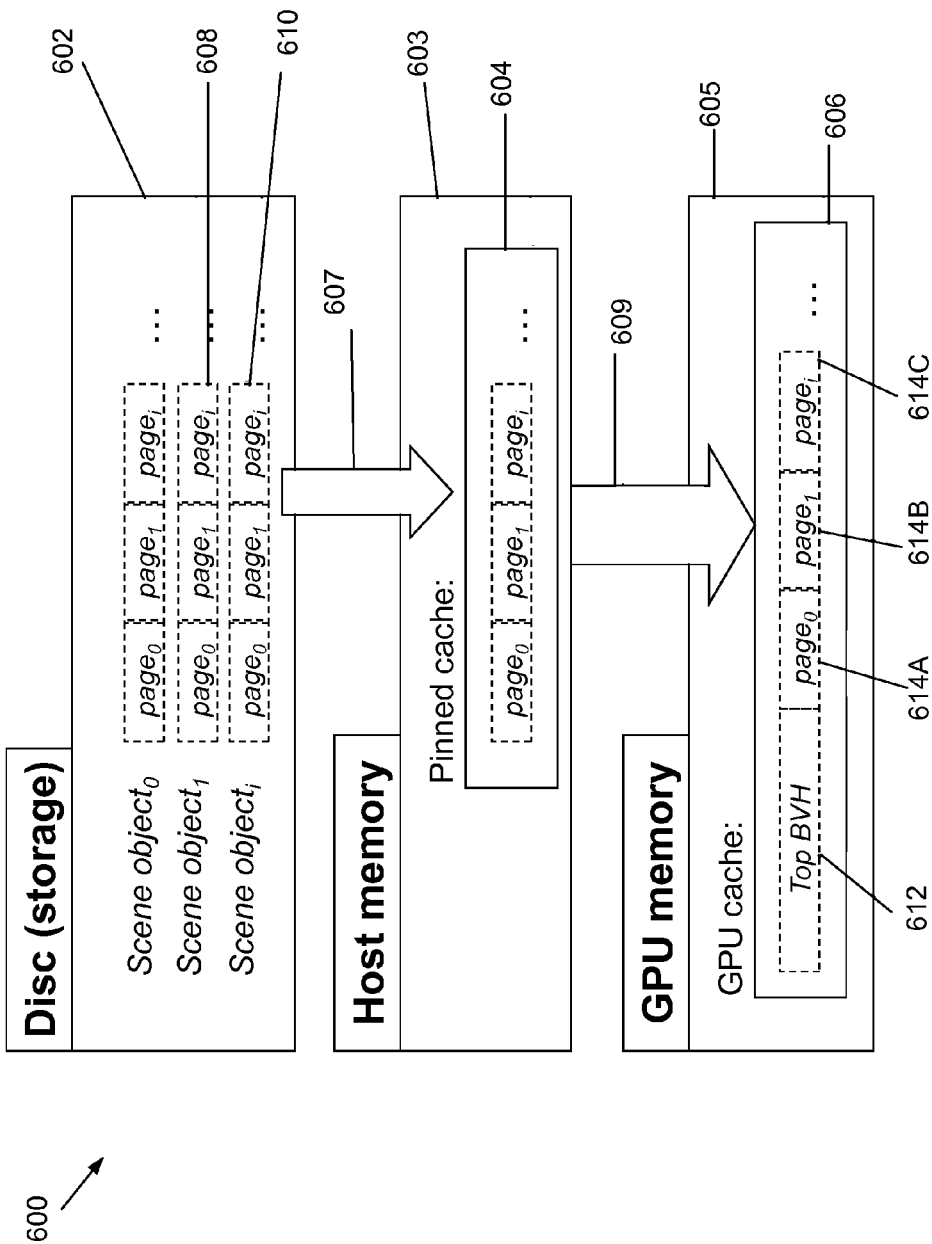
FIG. 6 is a schematic diagram that illustrates one example method for organizing in memory an entire picture as employed by an embodiment of a graphics processing system.

Reference is now made to FIG. 6, which illustrates one embodiment of a whole picture of the memory organization 600 of an acceleration structure and associated method, the memory organization comprising the disc storage 602, pinned cache 604 (a subset of host processor memory 603), and GPU cache 606 (a subset of GPU memory 605). Note that the memory structures shown in FIG. 6 are similar to the memory structures depicted in FIG. 2 (e.g., disc storage 206 of FIG. 2 is the same or similar to disc storage 602, host processor memory 219 is the same or similar to host processor memory 603, etc.). In one embodiment, all the data is stored on the disc storage 602 in target processing the scenes with large content (and discs may have large capacity). Each 3D object of the scene (e.g., scene object0 (file0) 608 to scene object$_i$ (file$_i$) 610) may have geometry and other attributes stored in a separate file. The list of bottom level BVH pages are generated inside every 3D object (608, 610, etc.). These pages are stored in the file dedicated for this object. Further, the cache is allocated in the pinned cache 604 for the storage of the portion of requested bottom level pages. The pinned cache 604 is a limited region of the host memory 603. The bottom level pages are transferred from the disc storage 602 to this cache 604 on demand. The GPU cache 606 is a limited region (organized as a fixed size cache) of GPU memory 605. In one embodiment, the GPU cache is organized to store two parts of an acceleration structure: (1) the whole top level 612 of the acceleration structure (stored without paging)—which corresponds to the top level 402 of FIG. 4. This data is stored on the GPU as the rays-intersection queries access the top levels of the scene BVH very frequently. (2) The GPU cache 606 of bottom level pages 614A, 614B, 614C, etc. (correspond to bottom level 404A, 404B, 404C, etc., FIG. 4). The GPU cache 606 contains only a portion of all scene bottom level pages. The pages are transferred from the pinned cache 604 of bottom level pages to this cache 606 on demand. On demand data transfer (e.g. from disc storage 602 to pinned cache 604 and from pinned cache 604 to GPU cache 606) is controlled by the virtual memory manager 214 (FIG. 2) and by ray-primitive intersection search queries comprised in the parallel compute logic 208 (FIG. 2).

Figure 7A:
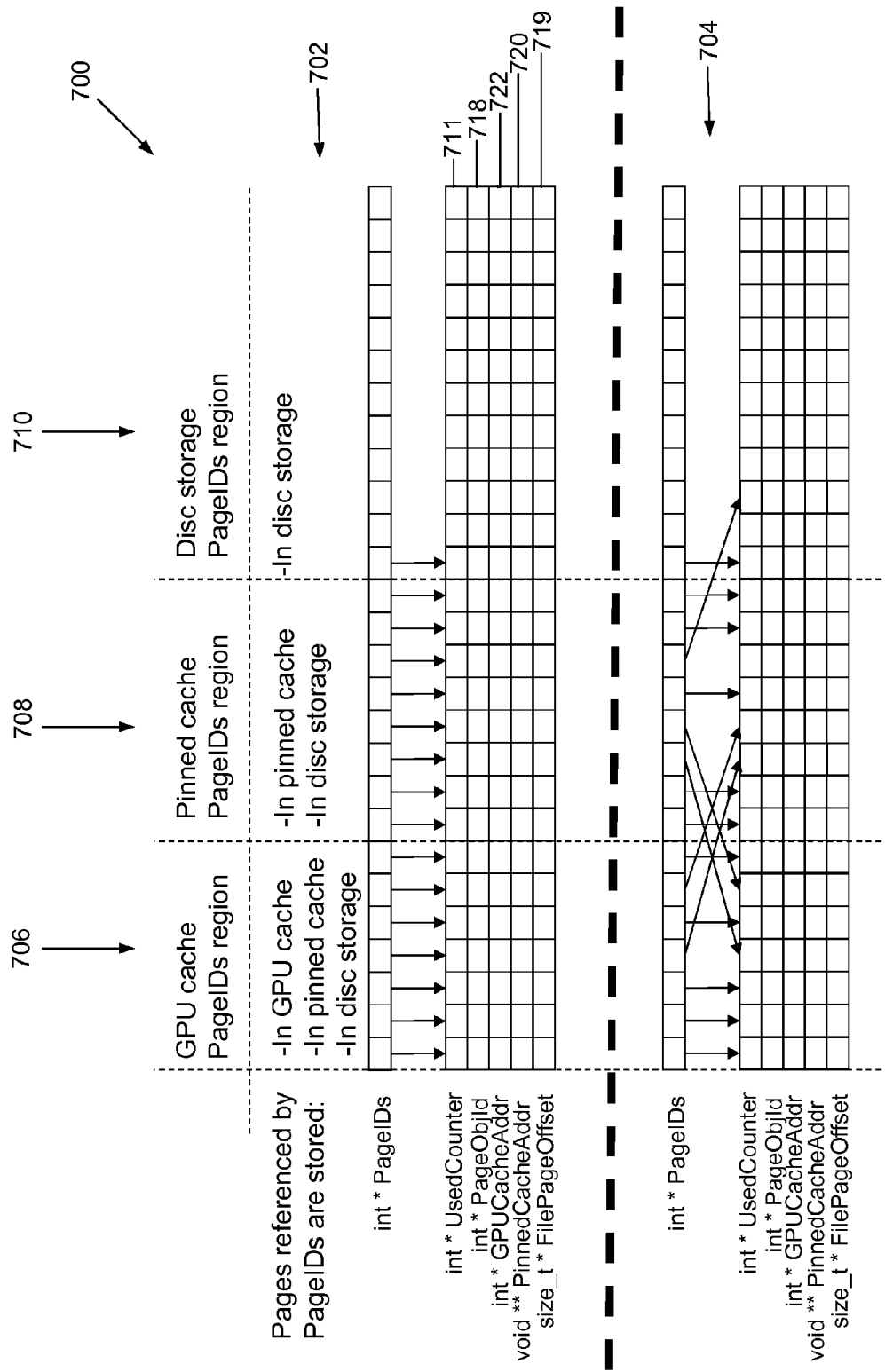
FIG. 7A is a schematic diagram that illustrates one example method for arranging page table entries as employed by an embodiment of a graphics processing system.
Figure 7B:
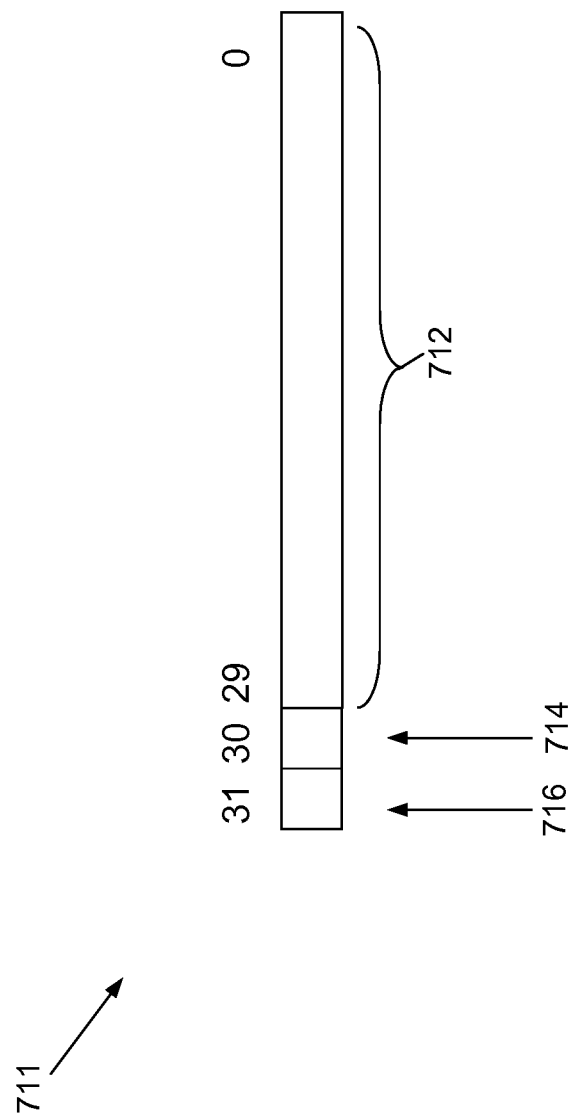
FIG. 7B is a schematic diagram that illustrates an example counter utilized in the process of arranging page table entries.

Referring now to FIG. 7A, shown are page table entries corresponding to bottom level BVH pages, including an initialized page table 702 and a reshuffled page table 704 (e.g., after several iterations of page swapping). In one embodiment, the information about the page base addresses in the disc storage, pinned memory and GPU cache is stored in the page tables 702. The page tables 702 also contain the counters 711 (FIG. 7B, explained below) for all the pages that are necessary to compute the order of the page transfer from disc to pinned memory and from pinned memory to the GPU cache. The array PageIDs contains the identifiers (IDs) of the pages, wherein the page ID array determines the location of the referenced pages in the cache hierarchy: GPU cache, pinned cache or disc storage. For the bottom level, the PageIDs comprises three regions: the sequence 706 of page IDs referencing the pages stored in GPU cache 606 and pinned cache 604 and disc storage 602; the sequence 708 of page IDs referencing the pages stored in the pinned cache 604 and disc storage 602, and the sequence 710 of page IDs referencing the pages which are stored only on the disc storage 602.

In one embodiment, when the whole scene BVH and all the bottom level pages are constructed, the caches are filled with initial data. All the bottom level pages are stored on the disc. The first numPinnedCachedPages are stored in the pinned memory cache. The first numGPUCachedPages are stored in the GPU cache. The number of cached pages stored in the GPU memory and pinned memory is determined by the memory capacity of GPU cache and pinned memory cache. With reference to the reshuffled page table 704 after page swapping, the pageIDs refer to different page table entries, which means that the pages referenced from different regions of PageIDs (e.g., GPU, Pinned, or disc region) are stored in different physical regions as a result of page eviction and transfer on demand from disc storage to pinned cache and to GPU cache. Physical page addresses are encoded in GPU cacheAddr 722, PinnedCacheAddr 720, PageObjId 718, and FilePageOffset 719.

Each of the entries noted in the tables 702 and 704 are described briefly below. Beginning with UsedCounter 711 (in one embodiment this counter has 32 bits), and referring also to FIG. 7B, the first 30 bits 712 of this word determine the number of rays which are trying to access the page for ray-primitive intersection search. The $31^{st}$ bit 714 determines the WAS_READ flag of the page. In one embodiment, this flag 714 is set to 1 only when the page has already been tested for intersection in the iterative process (see pseudocode1 below). The $32^{nd}$ bit 716 determines the OUT_OF_CORE flag of the page. In one embodiment, this flag 716 is set to 1 only when the page is not in the GPU cache. The ray-primitive intersection search process can access the BVH page when the OUT_OF_CORE flag is equal to zero.

Referring again to FIG. 7A, the PageObjId 718 comprises the ID of the scene object the page belongs to. The storage filename of the pages generated for this object and internal FilePageOffset 719 of the single page within this file is the address of the page on the disc. Bottom level pages are stored on the disc.

The pinnedCacheAddr 720 comprises a pointer to the memory buffer in the pinned cache (corresponds to 604 in FIG. 6) which is used for temporal page storage. This pointer 720 is dynamic for the bottom level pages because only the portion of them is stored in the pinned cache.

The GPUCacheAddr 722 comprises the temporal page address inside the GPU cache (606 in FIG. 6). This address is dynamic for bottom level pages because only the portion of them is stored in the GPU cache for temporal usage in ray-primitive intersection procedure.

Having described example hierarchical memory structures for certain embodiments of graphics processing systems, a focus now is on ray-primitive intersection searches in a scene acceleration structure. In one embodiment of a graphics processing system, the process of ray-primitive intersection searching is executed on the GPU, which is capable of processing millions of parallel threads on several hundred compute cores (e.g., computational logic). Each ray from a ray queue is mapped to a single thread based on the consideration that the search for primitive intersections is independent for each ray. A parallel program that executes on the GPU and computes the ray-primitive intersections for many rays is referred to herein as a "GPU ray traversal stage" or "ray-intersection kernel". When this stage (kernel) starts working, the ray-primitive intersection search is started for all the rays concurrently.

One example method embodiment, embodied in pseudocode (referred to herein as pseudocode1), provides a main-loop of a ray-primitive intersection search for a large scene, and includes the following:

```
void ray_primitive_intersection_search(RAY_QUEUE ray_queue,
GDM data_manager, BVH bvh)
{
    // [SETUP STAGE]:
    // the rays start traversal from the BVH root
    for(all rays in the ray_queue) // parallel for, works on GPU
        rays[i].restart = bvh.toplevel_root;
    // Start searching for ray intersections: no any BVH page was read
    for(all data_manager.pagetable_entries) { // parallel for, works on
GPU
        data_manager.UsedCounter[i] = 0;
        WAS_READ(data_manager.UsedCounter[i]) = 0;
    }
```

-continued

```
int available_new_data = 1;
while(available_new_data) {
    // [GPU RAY TRAVERSAL STAGE]:
    // For all rays:  Search for primitive intersection inside the BVH
    //                pages which are located in the GPU cache
    //                (in-core) Request out-of-core BVH-pages data
    //                (the not in GPU)
    ray_intersection_kernel(ray_queue, data_manager, bvh);
    // [PAGE REPLACEMENT STAGE]:
    // Bring missing data to GPU cache
    available_new_data = swap_requested_pages(data_manager);
  }
}
```

Note that the term ray_intersection_kernel( ) is also referred to herein as "GPU ray traversal stage", and that the term swap_requested_pages( ) is also referred to herein as "Page replacement stage". The loop described in pseudocode1 invokes the ray_intersection_kernel and searches for ray intersections in the bottom level BVH-pages which are in-core (in the GPU memory) using the acceleration structure 400 (FIG. 4). If the ray, while searching for an intersection, tries to access the representative of the out-of-core page 404 (see FIG. 4) then it is marked as requested (utilizing the increment of UsedCounter 711 of the page table 702/704, FIG. 7A). After experiencing the first k events of requests for out-of-core pages, the ray continues searching for intersections with in-core BVH pages only without requesting the other out-of-core pages (also referred to herein as speculative traversal). After all the rays are done in the current call of ray_intersection_kernel( ), the function swap_requested_pages( ) is invoked, which brings requested pages to the GPU cache. If some new pages are transferred to the GPU, then the rays restart searching for intersections. As noted in the pseudocode 1, the rays may re-enter the BVH traversal process (which is implemented in ray_intersection_kernel).

As described previously with respect to FIGS. 7A-7B, the $31^{st}$ bit of UsedCounter is the flag referred to as WAS_READ.

If this flag is equal to 1, then this page was tested for intersection with all the rays which could potentially intersect this BVH-page. The usage of this flag avoids redundant ray intersection searches and avoids double transfer of the same BVH page to the GPU memory. This is possible because of the use of speculative traversal: in the single call of ray_intersection_kernel( ), the intersection is tested with all possible BVH-pages the ray can intersect (if they are in-core). The flag WAS_READ is valid in the scope of the ray_primitive_intersection_search( ) function, which explains why this flag is reset before entering the while loop of the pseudocode1.

Figure 8:
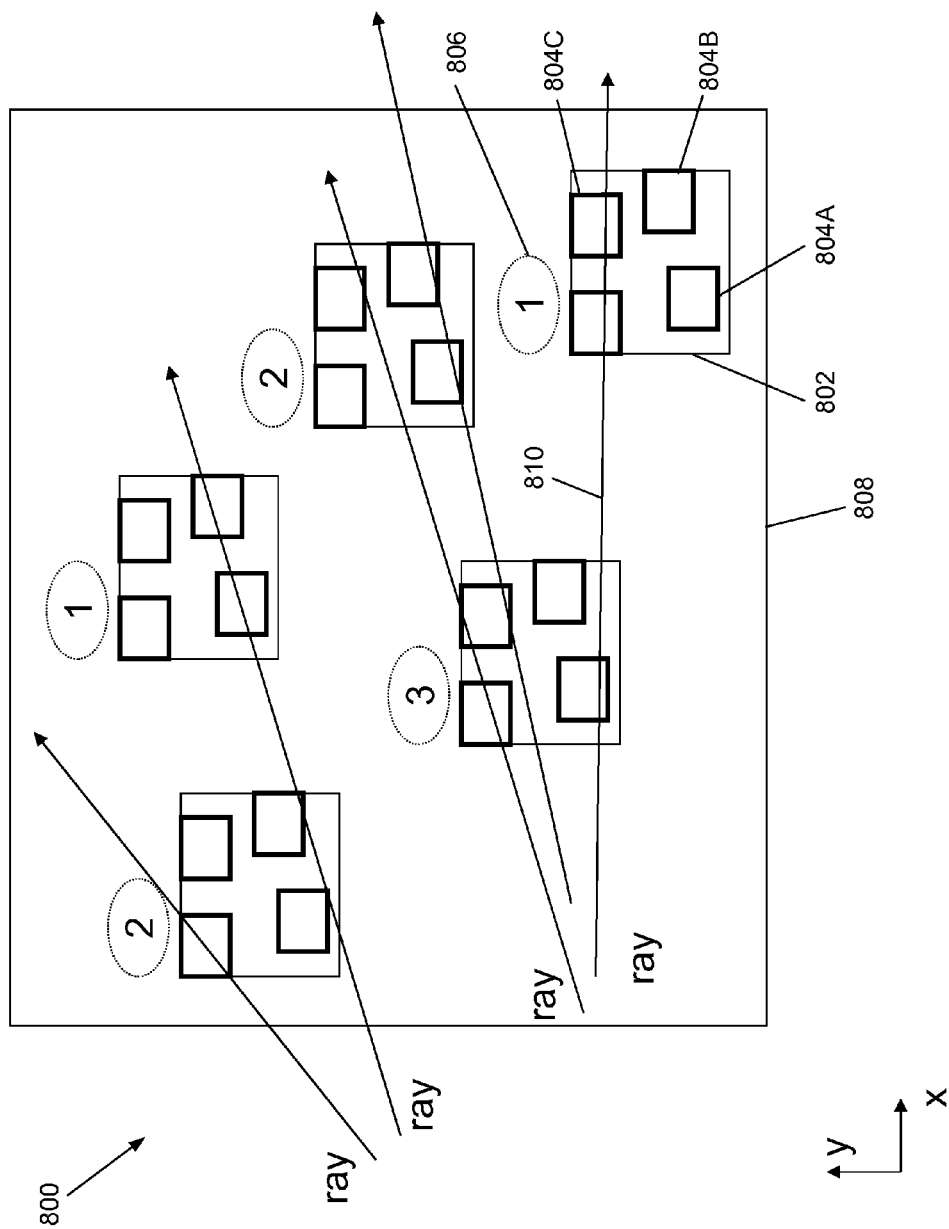
FIG. 8 is a schematic diagram that illustrates one example method employed by an embodiment of a graphics processing system for traversing through an acceleration structure searching for intersections with scene primitives.

Considering now ray traversal inside the BVH, in one embodiment, for each parallel thread of a ray-intersection kernel the ray-primitive intersection search is organized as a ray traversal through the acceleration structure shown in FIG. 4. The ray traverses through the inner nodes of the binary BVH, descends to the bottom most level of the BVH, and computes intersections with the underlying primitives that form the geometry. Graphic presentation of this method embodiment is illustrated in FIG. 8. In other words, FIG. 8 provides a graphic representation of rays that traverse through an acceleration structure searching for intersections with a scene primitive. The acceleration structure 800 comprises a top level BVH 808 (corresponds to 402 FIG. 4) and referenced bottom level BVHs 802 (corresponding to 404A, 404B, 404C, etc. FIG. 4). Internal nodes of bottom level BVH pages are denoted with 804A, 804B, 804C, etc. Used counter 806 of every bottom level BVH page (corresponds to the field 711 of page table 702/704, FIG. 7A) counts the number of rays 810 which try to access the bottom level page during a ray primitive intersection search.

One embodiment of an example code of ray_intersection_kernel is given in the pseudocode2 below. In other words, an embodiment of code for the ray-primitive intersection search, referred to herein as pseudocode2, is disclosed in the following description, where the search may be performed inside the scene acceleration structure (e.g., the hierarchy view is shown in FIG. 4; the spatial view is presented in FIG. 8).

```
void ray_intersection_kernel(RAY_QUEUE ray_queue, GDM data_manager, BVH bvh) {
    for(all rays in the ray_queue) // parallel for, works on GPU
        traverse_BVH(rays[i], data_manager, bvh);
}
void traverse_BVH(RAY ray, GDM data_manager, BVH bvh) {
    if(ray.restart < 0) return; // no need to re-enter
    int ooc_pages_dec = K_ALLOWED_OOC_PAGES_TO_REQUEST;
    int node_addr = ray.restart; // the base of the pair of two sibling nodes
    int ray_stack[STACK_SIZE];
    push(ray_stack, END);
    while(node_addr != END) {
        while(not_leaf(node_addr) && node_addr != END)
            descend_through_bvh(node_addr, ray, ray_stack, bvh);
        if(is_leaf(node_addr)) {
            int PageId = GetPageId(node_addr);
            if(traverse_BottomLevel(ooc_pages_dec, ray, data_manager, bvh, PageId) == 0)
                ooc_pages_dec -= 1;
        }
        node_addr = pop(ray_stack);
    }
    if(ooc_pages_dec == K_ALLOWED_OOC_PAGES_TO_REQUEST) ray.restart = -1;
}
int traverse_BottomLevel(int ooc_pages_dec, RAY ray, GDM data_manager, BVH bvh, int page_id) {
    // Get BVH-page descriptor
    int pdesc = data_manager.BottomLevel.UsedCounter[page_id];
    // WAS_READ is the 31st bit of pdesc
    if(WAS_READ(pdesc) != 0) return 1; // traversed on the previous pass, exit
    // If in-core: Increase the counter of accessing rays
    // If out-of-core: the counter is incremented only for the first OOC page the ray tries
    to access
    // IS_OOC is the 32nd bit of pdesc
    if(!IS_OOC(pdesc) || ooc_pages_dec > 0)
```

```
    atomicAdd(&data_manager.BottomLevel.UsedCounter[page_id], 1);
    if(IS_OOC(pdesc)) return 0; // encountered an out-of-core page, interrupt
    // BVH-page is in-core
    int node_addr = page_bvh_base_addr(page_id); // the base of the pair of two sibling
nodes
    int ray_stack[STACK_SIZE];
    push(ray_stack, END);
    while(node_addr != END) {
        while(not_leaf(node_addr) && node_addr != END)
            descend_through_bvh(node_addr, ray, ray_stack, bvh);
        if(is_leaf(node_addr))
            intersect_primitives(node_addr, ray);
        node_addr = pop(ray_stack);
    }
    return 1; // traversed successfully
}
void descend_through_bvh(int & node_addr, RAY ray, int * ray_stack, BVH bvh) {
    // test the AABBs of 2 child nodes with IDs: node_addr and node_addr + 1
    // continue traversal with the child closest to the ray origin
    // the other child (if intersected) is pushed to the stack
    if(ray_intersects_any_of_two_children(ray, node_addr, bvh)) {
        {near_node, far_node} = sort_children_along_the_ray(node_addr, node_addr + 1);
        node_addr = near;
        if(is_intersected(far_node))
            push(ray_stack, far_node);
    }
    else node_addr = pop(ray_stack);
}
```

Explaining pseudocode2 from a higher level perspective, each ray-primitive intersection search process starts with traversing acceleration structure 800 (FIG. 8) from the root node of the top level 808 (corresponds to 402 FIG. 4) and descending down to the bottom level BVH pages 802 (corresponding to 404 FIG. 4)) and down to the leaves of bottom level pages containing individual primitives. The result of the ray-primitive search function comprises the reference to the primitive spatially intersected by the ray (or nothing if there is no intersection).

The process of a top-down search through the acceleration structure uses the hierarchical connections 406A, 406B, 408 among the nodes of the BVH. If the ray 810 intersects with one node (intersecting a node by a ray corresponds to spatial intersection between the ray and the axis-aligned bounding box AABB 320A, FIG. 3B, of the node) then it is tested for intersection with both direct children of this node:

If both children are intersected by the ray, then they are sorted along the ray (the first child has the AABB which is closest to the ray origin). Then the search process proceeds with the children of this first child. The other child is pushed to the stack associated with the ray.

If only one child intersects the ray, then the search process descends to the children of this child.

If no any child intersects the ray, then the search process continues with the other node popped from the stack associated with the ray (see the descend_through_bvh function).

If the ray primitive intersection search process reaches the leaf of the top level BVH 808 (corresponds to 402 FIG. 4), then this leaf contains the reference to the single bottom level BVH-page. If this page is in-core, the counter of accesses to this page (UsedCounter) is incremented. If this page is out-of-core (and if it is one of the first k out-of-core pages touched by this ray in the current pass of ray_intersection_kernel), the counter of accesses to this page is also incremented. Further, this counter is used as a measure of priority of the page when a determination is made as to which pages should be transferred to the GPU earlier than others.

After the ray intersection search has requested the first k out-of-core pages, the ray traversal is not stopped waiting for these pages. Instead, the other BVH nodes are popped from the stack and tested for ray-primitive intersections with the other BVH-pages, which may be potentially in-core, and provided with a correct intersection (closest or any intersection). This computation may be referred to as speculative traversal. This order of computation allows using the flag WAS_READ to avoid double intersection tests of the ray with the same BVH-page flag.

The order of requesting the out-of-core BVH pages is important. In one embodiment, there is an implementation of descent through the BVH, and among two inner nodes, in one embodiment, the closest node is always (or substantially in some embodiments) preferred to descend through. When the ray tries to access the first out-of-core BVH-page, then this page is also the closest out-of-core page to the ray origin. A lot of rays try to access the BVH pages in parallel; the rays increment the UsedCounter using atomic increment. With this atomic increment, the group of rays "votes for" (e.g., determines, as in statistically determines) the most popular pages (which might be tested for intersection first). The out-of-core pages with the large values of UsedCounter will be transferred to the GPU cache earlier than the pages with a low score. The example of UsedCounters 806 for all bottom level BVH pages is shown on FIG. 8; these counters are incremented with traversal rays 810.

If the search process reaches the reference to the scene primitives (available in the leaves bottom level BVH pages 802) they are tested for spatial intersection between the ray and all the primitives. In the case of intersection the search results are updated.

Figure 9:
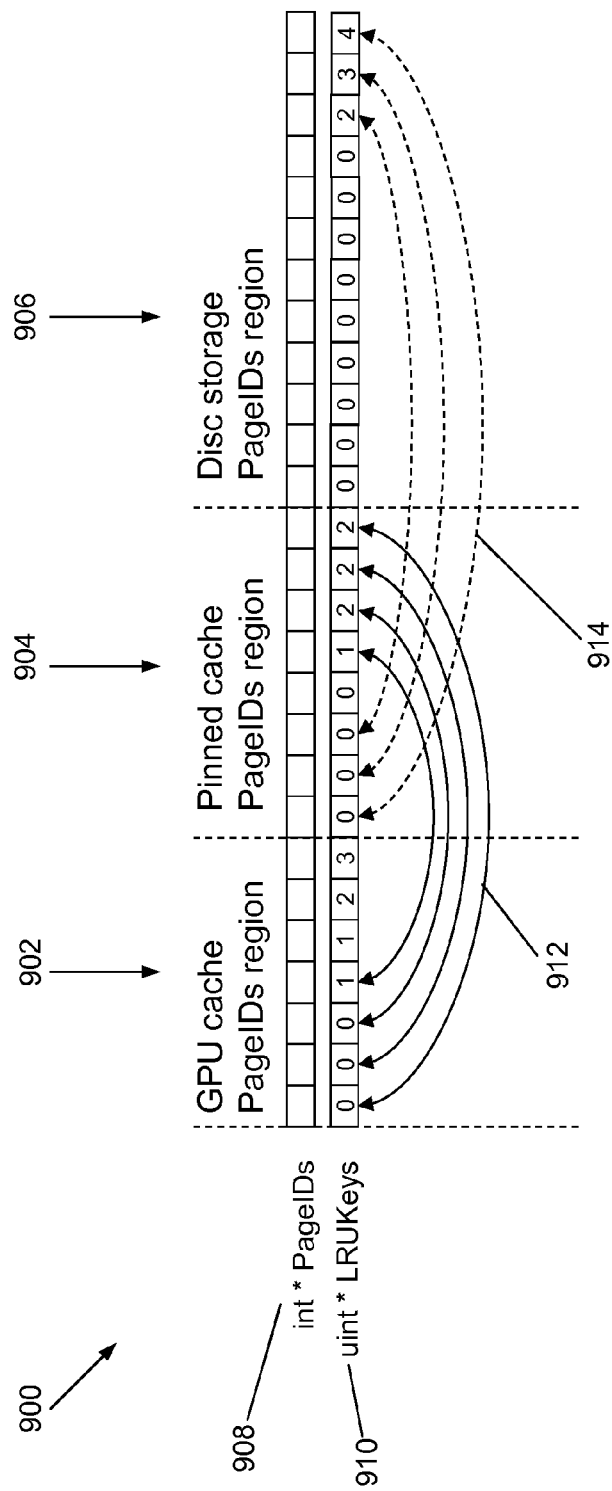
FIG. 9 is a schematic diagram that illustrates one example method employed by an embodiment of a graphics processing system for ordering page transfers.

Attention is now directed to FIG. 9, which illustrates one example transfer order of BVH pages. The page transfer from Disc to Pinned cache and from Pinned cache to the GPU memory is implemented inside a swap_requested_pages (data_manager) function. The order of page transfer is driven by UsedCounter (corresponds to 806 FIG. 8 and 711 FIG. 7A), which is accumulated inside the ray traversal. Shown in FIG. 9 is int*PageIDs 908 and uint*LRUkeys 910. Sorting the array PageIDs by these keys determines the order of page eviction and transfer on demand from disc to pinned cache and GPU cache on demand.

Explaining FIG. 9 further, the array PageIDs has three sequences of page IDs 902, 904, and 906 (the page contents referenced by page IDs belonging to these sequences are stored respectively in GPU cache, in pinned cache, on the Disc). For all these IDs, the corresponding LRUKeys are built according to the following example code (referred to herein as pseudocode3):

```
void build_lru_keys(GDM data_manager) {
  for(all data_manager.pagetable_entries) { // parallel for, works on GPU
    int page_id = data_manager.PageIDs[i];
    int flag = 0;
    if(i belongs to PinnedCache region) flag = 2;
    else if(i belongs to Disc region) flag = 3;
    int priority = max(0, min(data_manager.UsedCounter[page_id], 0x3FFFFFFF));
    // if the page was tested for intersection then remove any priority for this page
    if(WAS_READ(data_manager.UsedCounter[page_id])) {
      if(i belongs to PinnedCache region) priority = 0;
      if(i belongs to Disc region) priority = 0;
    }
    // all the pages passed through GPU cache set this flag on
    if(i belongs to GPUCache region)
      WAS_READ(data_manager.UsedCounter[page_id]) = 1;
    LRUKeys[i] = (flag << 30) | priority;
  }
}
```

Once the LRU keys are built as disclosed in the example code above, the array PageIDs 908 are sorted using the array LRUKeys 910 as the keys. After that, inside every region (GPU cache 902, Pinned Cache 904, Disc 906), all the PageIDs are sorted in the order of their corresponding LRUKeys. These keys determine the order of page ID swapping inside the PageIDs array, which in one embodiment is as follows:

(1) the mostly needed page (referenced by PageID[i]) from pinned cache region 904 (with corresponding LRUKey[i]>0) is transferred in the place of least recently used page (referenced by PageID[j]) from the GPU cache region 902, the values PageID[i] and PageID[j] are swapped 912. In one embodiment, the number of page ID swaps cannot exceed the number of pages that can be stored in the GPU cache 902.

(2) the mostly needed page (referenced by PageID[i]) from disc storage region 906 (with corresponding LRUKey[i]>0) is transferred in the place of not needed page (referenced by PageID[j] with corresponding LRUKey[j]=0) from the pinned cache 904 region, the values PageID[i] and PageID[j] are swapped 914. In one embodiment, the number of page ID swaps cannot exceed the number of pages that can be stored in the pinned cache 904.

(3) All the priority bits (e.g., first thirty bits) of the UsedCounter for all the pages are set to zero.

The above-described order of transfer scheme of transferring data from the disc to the pinned cache and from pinned cache to GPU cache (e.g., illustrated in FIG. 9) may be described in code, disclosed as follows and referred to as pseudocode4:

```
void pinned2gpu_page_transfer(GDM data_manager)
{
  unsigned int * pinned2gpu_pages; // page ids to be transferred to GPU
  int numTransferPages = 0;
  // swap page IDs between Pinned cache and GPU cache table regions
  for(all i belonging to GPUCache region) // parallel for, works on GPU
  {
    int gpu_i = i; // least recently used pageID from GPUCache
    int pinned_i = numGPUCachedPages + numPinnedCachedPages - 1 - i; // most needed pageID from PinnedCache
    int priority = LRUKeys[pinned_i] & 0x3FFFFFFF;
    if(priority > 0) { // if the page from pinned region was really requested
      int gpu_pageId = data_manager.PageIDs[gpu_i];
      int pinned_pageId = data_manager.PageIDs[pinned_i];
      pinned2gpu_pages[numTransferPages] = pinned_pageId; // pageID to be transferred
      numTransferPages++;
      // new address of the page incoming to GPU cache
      data_manager.GPUCacheAddr[pinned_pageId] = data_manager.GPUCacheAddr[gpu_pageId]; //transfer destination
      data_manager.GPUCacheAddr[gpu_pageId] = -1; // the page is evicted from GPU cache
      // set the 32nd bit to 0 for pages that will be in-core (in GPU cache)
      IS_OOC(data_manager.UsedCounter[gpu_pageId]) = 1; // will not be in GPU cache
      WAS_READ(data_manager.UsedCounter[gpu_pageId]) = 1; // was processed in GPU
      IS_OOC(data_manager.UsedCounter[pinned_pageId]) = 0; // will be in GPU cache
      swap(data_manager.PageIDs[gpu_i], data_manager.PageIDs[pinned_i]); // update page IDs
    }
    else break; // don't transfer
  }
  // page-data transfer from pinned cache to gpu cache (recorded page ids have updated GPUCacheAddr)
  Pinned2GPUDataTransfer(pinned2gpu_pages, numTransferPages);
}
void disc2pinned_page_transfer(GDM data_manager)
{
  unsigned int * disc2pinned_pages; // page ids to be transferred to the PinnedCache
  int numTransferPages = 0;
  // swap page IDs between Disc and Pinned cache table regions
  for(all i belonging to PinnedCache region) // parallel for, works on GPU
  {
    int pinned_i = i; // least recently used pageID from PinnedCache
    int disc_i = numAllPages - 1 - i + numGPUCachedPages; // most needed pageID from Disc
    int priority_p = LRUKeys[pinned_i] & 0x3FFFFFFF;
```

```
    int priority_d = LRUKeys[disc_i] & 0x3FFFFFFF;
    if(priority_p == 0 && priority_d > 0) // if the page from disc region was really
requested
    {
      int pinned_pageId = data_manager.PageIDs[pinned_i];
      int disc_pageId = data_manager.PageIDs[disc_i];
      disc2pinned_pages[numTransferPages] = disc_pageId; // pageID to be transferred
      numTransferPages++;
      // new address of the page incoming to the PinnedCache
      data_manager.PinnedCacheAddr[disc_pageId] =
data_manager.PinnedCacheAddr[pinned_pageId];
      data_manager.PinnedCacheAddr[pinned_pageId] = -1; // the page is evicted from
the PinnedCache
      IS_OOC(data_manager.UsedCounter[disc_pageId]) = 1; // not in GPU cache
      IS_OOC(data_manager.UsedCounter[pinned_pageId]) = 1; // not in GPU cache
      swap(data_manager.PageIDs[pinned_id], data_manager.PageIDs[disc_i]);
    }
    else break; // don't transfer
  }
  // page-data transfer from disc to pinned cache (recorded page ids have updated
PinnedCacheAddr)
  Disc2PinnedCacheDataTransfer(disc2pinned_pages, numTransferPages);
}
```

Explaining the pseudocode4 from a higher perspective, consider first the page data transfer from a cache level 3 (e.g., disc) to a cache level 2 (pinned cache). This process is implemented trivially: the i-th page id is read from page_i=disc2pinned_pages[i], and a determination is made of the address of this page in the disc (the file via data_manager.PageObjId[page_i] and the page offset in the file using data_manager.FilePageOffset[page_i]). Then this source page data is transferred to the buffer pointed by data_manager.PinnedCacheAddr[page_i] using fread operation (e.g., read from disc into buffer inside RAM). In one embodiment, the pinned memory region of the CPU Random Access Memory cannot be swapped out by the Operating System). Although such pinned buffers may provide slow memory access when attempts are made to read from them on the CPU, they are as fast as non-pinned buffers when there are attempts to write to this buffer on the CPU.

Figure 10:
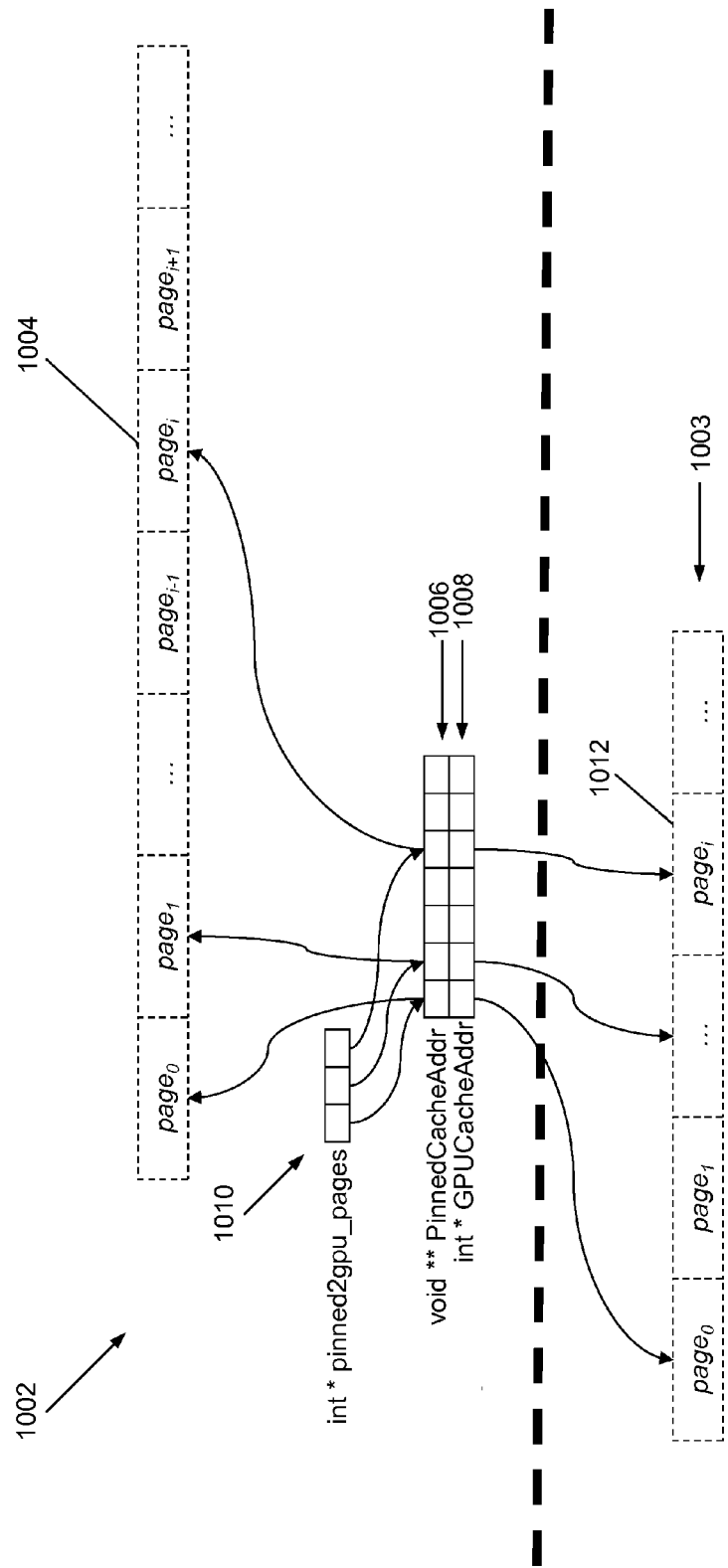
FIG. 10 is a schematic diagram that illustrates one example method employed by an embodiment of a graphics processing system for implementing page transfers between caches.

FIG. 10 and example pseudocode described below (herein, pseudocode5) describe the page data transfer from cache level 2 (e.g., pinned cache) to cache level 1 (e.g., GPU cache). With transfers of the pages to the GPU cache only from the Pinned memory region, certain embodiments may utilize the known zero-copy mechanism (for reference, see CUDA Programming Guide, NVIDIA 2010). For instance, the whole pinned memory (which is located on the CPU physical RAM) may be mapped to the GPU address space. When this memory, located on the CPU pinned RAM, is mapped to the GPU Address space, this data may be accessed from inside the GPU kernels. When accessing this data from the GPU kernels, it is transferred through the PCI-Express bus (e.g., if the GPU and CPU have different physical memory). The GPU kernels may be organized in vectors (e.g., a group of threads; a warp of threads for CUDA), which access data and compute. The transfer rate of such "mapped" data is faster when coherent threads (within the vector) access coherent words of "mapped" memory:

```
for(thread_id = 0; thread_id < n; thread_id++) // parallel for
    gpu_buffer[thread_id] = mapped_data[thread_id]; // delivered
in batches through the PCI-Express
```

Pseudocode5 is described below, which provides a GPU kernel that downloads the BVH pages from pined cache to the GPU cache:

```
void Pinned2GPUDataTransfer(unsigned int * pinned2gpu_pages,
int numTransferPages)
{
    // PageSizeInWords - the size of the page measured as the
PageSizeInBytes / sizeof(WORD) - 4bytes can be an example of word
which is read by one thread
    int numTransferWords = numTransferPages * PageSizeInWords;
    // implemented as GPU kernel (each GPU thread executes the body
of this loop
    for(int thread = 0; thread < numTransferWords; thread++) // parallel for
    {
      int pageID = pinned2gpu_pages[thread / PageSizeInWords]; //
reference to the entry in the page table
      int wordID = thread % PageSizeInWords; // local word id inside
      the page
      WORD * SrcMappedPageData =
      (WORD *)(data_manager.PinnedCacheAddr[pageID]);
      WORD * DstGPUCacheAddr =
      (WORD *)(data_manager.GPUCacheAddr[pageID]);
      // distributes the word inside the Structure of Array GPU Cache
among BVH Boxes, Info or Primitives
      DstGPUCacheAddr[wordID] = SrcMappedPageData[wordID];
    }
}
```

Certain embodiments of graphics processing systems include a special GPU transfer-kernel that reads the data from source pages in the pinned memory region (which is mapped to the GPU address space) and saves these contents in the GPU Cache. Pinned memory and zero-copy mechanisms enable transfer of the sparse data blocks (BVH pages) from CPU to GPU memory at a peak PCI-Express Bandwidth rate.

FIG. 10 (and the example pseudocode 5 noted above) shows details for one embodiment of the BVH-page transfer from pinned cache to GPU cache. FIG. 10 shows pages (e.g., page0, page1, etc.) 1004 in pinned cache 1002 (the source) and pages 1012 in GPU cache 1003. Also shown are page table fields 1006 and 1008 corresponding respectively to void**PinnedCacheAddr and int*GPUCacheAddr. The array pinned2gpu_pages 1010 determines the pages that should be transferred (1010 contains the IDs of respective pages). 1006 represents addresses of pages in the source pinned cache 1002 (different pages can be read from arbitrary memory positions); 1008 represents addresses of pages in the destination GPU cache 1003. The special-purpose data transfer GPU kernel (e.g., pseudocode 5) reads the page data from "mapped" pinned memory 1002 and stores it in GPU cache

1003. A data transfer is organized based on a block-contiguous read by the GPU of the region of the pinned cache mapped to the GPU address space, wherein a block-contiguous read corresponds to accessing several non-contiguously stored pages (e.g. page[0] and page[i] 1004, FIG. 10, are non-contiguous as there may be a space between these pages), wherein accessing within the scope of each page is contiguous: i.e., adjacent threads of the GPU transfer kernel read adjacent words from the page 1004 of the source and store to adjacent words of the page 1012 of the destination cache 1003. Such a memory pattern is processed well by current GPU hardware capabilities, which enables transferring the page contents at peak bandwidth as allowed by the PCI-Express bus or other busses in some embodiments.

Figure 11:
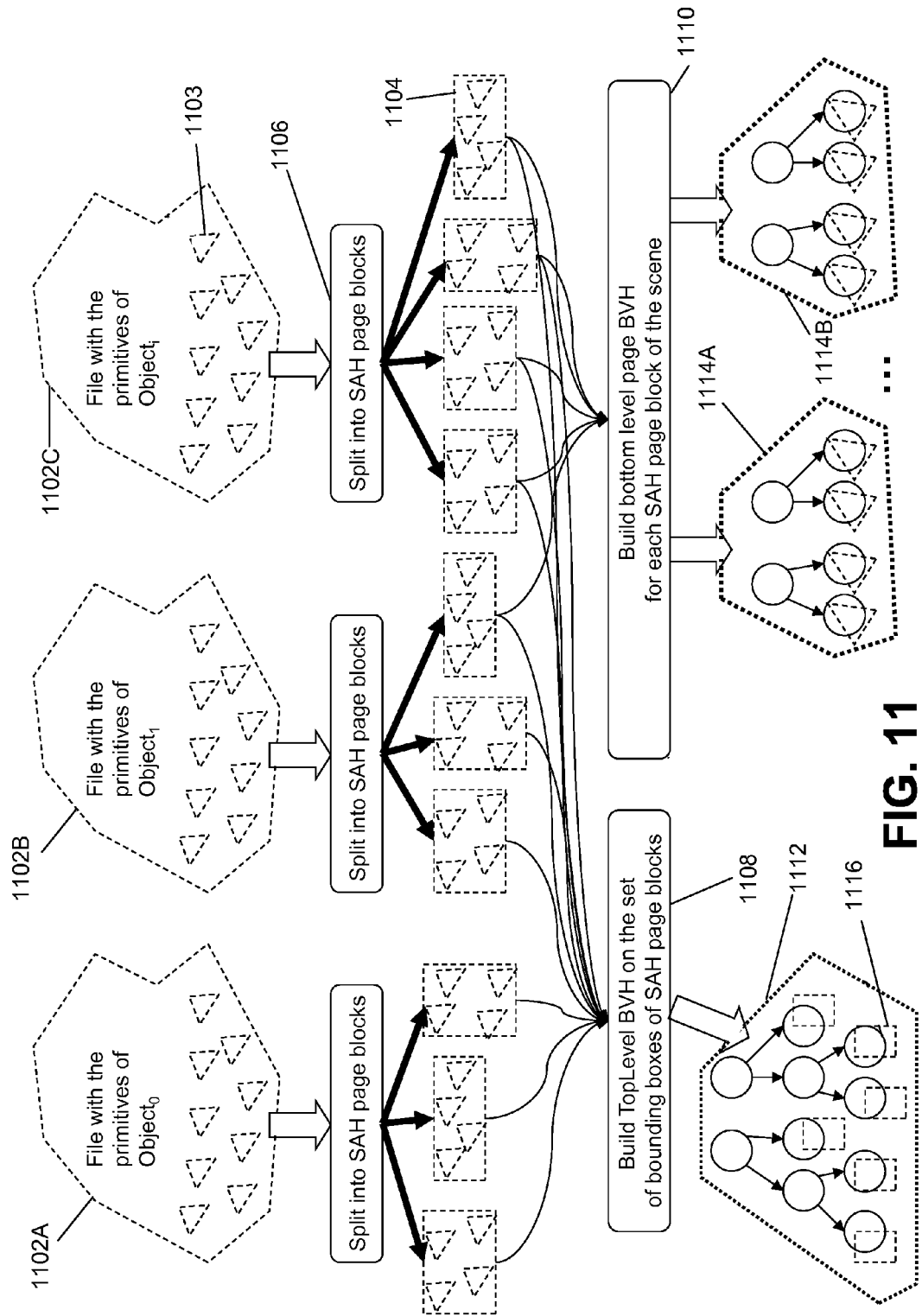
FIG. 11 is a schematic diagram that illustrates one example method employed by an embodiment of a graphics processing system for building an example acceleration structure.

Attention is now directed to FIG. 11, which illustrates a scheme of building an acceleration structure 400 (FIG. 4) of the scene. The whole scene may comprise many 3D models, 3D shapes, characters and other geometry objects 1102 (e.g., 1102A, 11028, 1102C, etc.), which represent different parts of the scene. Each 3D object contains geometry primitives/vertices 1103 and other attributes and may be stored in a separate file 1102 (e.g., 1102A, 11028, 1102C, etc.). If the contents of a 3D object file cannot be arranged entirely in the physical memory of the processor, then such a file is divided into chunks (disjoint sets of primitives), where each chunk is a smaller array of sequentially stored primitives and each chunk can be arranged entirely in the physical memory. Each such chunk is then treated as a separate 3D object 1102 which may be stored in a separate file. The subdivision into chunks is performed to enable the processing of 3D object with memory access within the bounds of processor physical memory. Using the procedure 1106 the primitives 1103 of each object 1102 are subdivided into the set of clusters. The cluster 1104 of primitives (also referred to herein as an SAH page-block of primitives) comprises a subset of the primitives that are spatially proximal to each other relative to the other of the primitives of the 3D object. For each cluster 1104, an equal size memory block is allocated in the memory, wherein each cluster can contain up to M primitives, where M is an integer number. In one embodiment, the memory block allocated for each cluster 1104 comprises M equal memory slots. A single primitive may be stored in a single slot of the cluster.

One way of building the spatial index/acceleration structure for the scene is according to the following method embodiment. For the primitives 1103 of each 3D object 1102 of the scene, generate the set of SAH page-blocks/clusters 1104 (see 1106). Each cluster 1104 unites up to M primitives which are proximal in 3D space. The 3D bounding volumes of the clusters 1104 are separated from the bounding volumes of the other clusters as well as possible (e.g., as described above in association with SAH). For each cluster 1104 of M primitives, build a BVH using SAH (e.g., a bottom level BVH) (see 1110). Almost all the bottom level BVHs 1114 have the same number of primitives, M, and almost the same number of nodes, PMAX. Each cluster (page-block) of primitives and corresponding bottom-level BVH determine a bottom level page (BVH page) 1114. For each page, a representative AABB (axis-aligned bounding box, corresponds to 320A FIG. 3) is computed. The representative AABBs of all the pages of the scene are organized (see 1108) under the top level BVH 1112, e.g., using a SAH heuristic. The use of bounding boxes as representations 1116 for the referenced bottom level page BVHs is shown in the top level BVH schematic 1112. Each leaf of the top level BVH has only a single reference to the single BVH page. It is convenient to use the page organization of the data (page organization referring to organizing data into memory blocks of equal size) when working with the page replacement policies such as LRU. All the pages have the same capacity (number of allocated bytes per page). The pages are explicitly generated and organized by the top level BVH (FIG. 4 represents corresponding hierarchical connections between top level BVH 402 and bottom level page BVHs 404).

Figure 12:
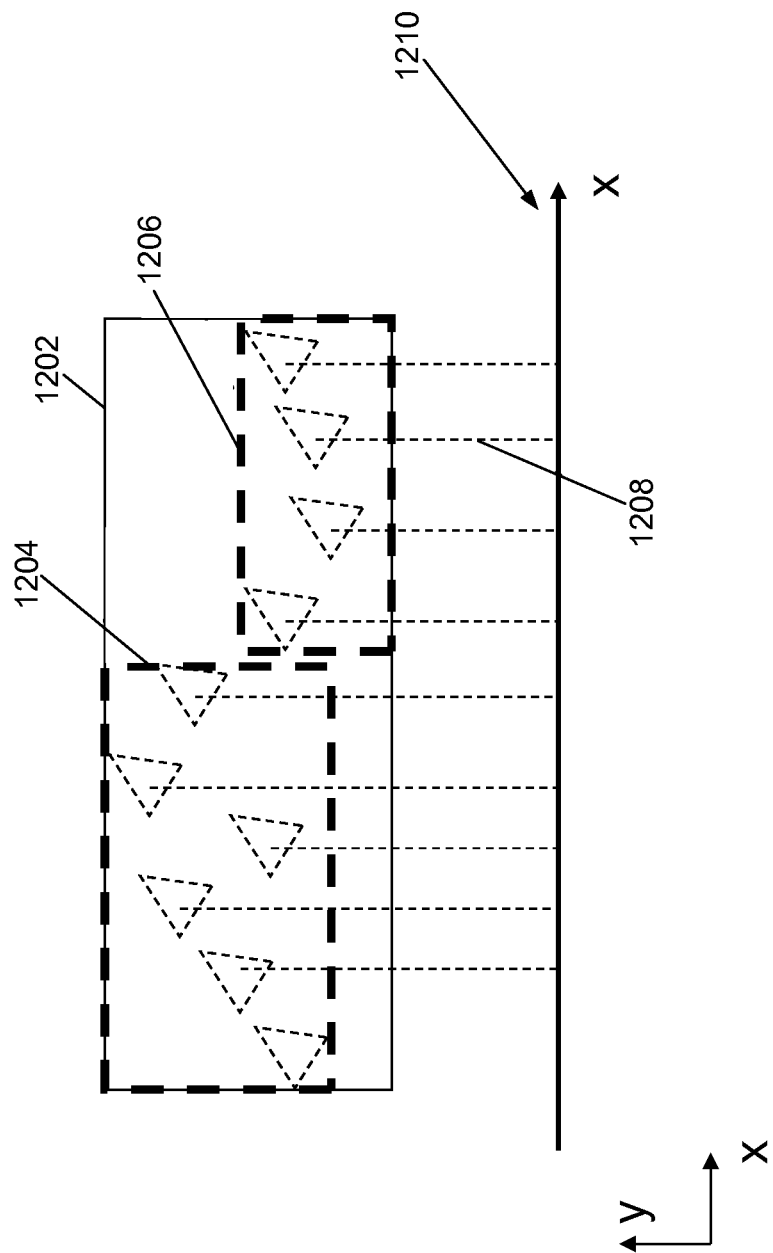
FIG. 12 is a schematic diagram that illustrates an example method employed by an embodiment of a graphics processing system for building clusters/page blocks from a set of input primitives.

Grouping the primitives into the set of clusters (SAH page blocks) 1106 may be performed according to one of several approaches. For instance, and referring to FIG. 12, shown is a schematic that illustrate an embodiment of a mechanism for generating a set of SAH page blocks using a memory efficient heuristic. As shown in this example, a node 1202 (node N) containing plural (e.g., ten (10)) primitives (shown as triangles) is divided into two (2) nodes—a left child node 1204 and a right child node 1206. Recursive subdivision occurs to the set of primitives united by the left node 1204 and the set of primitives united by the right node 1206. The subdivision process is finished when the node has less than or equal to M primitives. Then, the page block is configured to contain up to M primitives. There are Surface Area Heuristic (SAH) and Memory Efficient Heuristic (MEH) hints to facilitate this process. Considering the SAH hint, the node 1204 has c primitives, and c−1 split positions are evaluated at each primitive centroid 1208 (starting from the second primitive). At each i-th split position, c primitives can be separated into two (2) disjoint subsets of NL=i and NR=(c−i) primitives, respectively. Each split position has a subdivision cost as a combination of SAH and MEH hints and the set of primitives is finally subdivided at the split position with the lowest combined cost. With regard to the MEH hint, the split cost is lower for those positions where the values NL % M=0 or NR % M=0 where NL, NR comprise the number of primitives to the left or the right of the evaluated split position.

In one embodiment, the subdividing process for each node N comprises primitives are spatially sorted. For instance, primitives are sorted along each of the x, y, z, dimensions 1210. For instance, for each X, Y or Z sorting all the split positions are evaluated. For instance, set c=number of primitives in the scope of node N and c−1 split positions are evaluated. For instance, for each i ∈ [1 . . . c), NL=i, NR=c−i, AreaN=Area(AABB(U prim[k] for 0=k<c)), which is the surface area of the union bounding box for all of the primitives in interval [0 . . . c) of sorted primitives in the scope of node N.

AreaL=Area(AABB(U prim[k] for 0=k<i)), which is the surface area of the union bounding box for all of the primitives in interval [0 . . . i) of sorted primitives;

AreaR=Area(AABB(U prim[k] for i=k<c)), which is the surface area of the union bounding box for all of the primitives in interval [i . . . c) of sorted primitives, and where the i-th split position corresponds to the split plane orthogonal to axis 1210 which separates the primitives into two subsets (the left and the right).

Continuing, the MEH cost=(NL % M==0 or NR % M==0), the subdivide cost=(NL*AreaL+NR*AreaR)/AreaN;

if (MEH_cost==true) (i.e. if one number, NL or NR, is divisible by M) then subdivide cost=subdivide cost*pageCoef, where pageCoef ∈ [0 . . . 1] as selected by user.

To subdivide the primitives into disjoint subsets and proceed with recursive subdivision, the split position is selected with the smallest divide cost among c−1 evaluated split positions considering the primitive sorting along each dimension, X, Y and Z. A pageCoef<1 provides more chance to the split positions to be selected for the subdivision if the i-th split position can produce one subset where the number of elements is divisible by M.

With reference to FIG. 12, all the clusters (page blocks) of the primitives should be well separated from each other. For instance, almost all of the page blocks have M primitives, and a few page blocks have less than M primitives. This is driven by using MEH heuristic with pageCoef less than one.

From a higher level perspective, FIG. 12 illustrates that one method embodiment may separate the AABBs of the BVH pages from the AABBs of the other scene pages in 3D space as well as possible. The better separation may mean one or more of better empty space culling from geometry, better SAH cost estimation (referred as subdivide_cost in the text above), faster ray tracing, and/or faster rendering and faster other read requests processing driven by this acceleration structure. Almost all the BVH pages across the scene have M primitives (M=maximum number of primitives per page allowed by user; e.g., typical M=1000).

In one embodiment, first, the clusters of primitives are generated (the subsets of up to M primitives per each cluster). When the BVHs for these clusters are generated, they have the bounded number of BVH nodes. Overall it is possible to bound the number of bytes allocated for each bottom level BVH: M*sizeof(PRIMITIVE)+(2 M−1)*sizeof(BVHNode) where PRIMITIVE is an example structure of the scene primitive embodiment and BVHNode is an example structure of the BVH node.

If all the BottomLevel BVH pages have exactly M primitives, then the memory storage per page is utilized ideally. The surface area heuristic (SAH) may be used to generate the clusters of primitives which have up to M primitives and the AABBs of such clusters are well separated from each other.

Unfortunately, when using only the SAH method to generate the clusters/page-blocks, then every generated cluster has an average of approximately 0.6*M or up to 0.7*M primitives. This is a problem of clustering: each cluster should have the same number of elements, the memory storage should be utilized as much as possible (by up to 100%); the clusters should be well separated from each other in the 3D space.

In certain embodiments of the cluster/page-block generation, a modified SAH heuristic is used (e.g., MEH (Memory Efficient Heuristic)). This way, the resulting clusters are well separated from each other; an average cluster has approximately 0.9*M or up to 0.97*M primitives (i.e. close to 100% utilization), which means that the page memory allocation is utilized better than with the SAH method only. One example code, referred to herein as pseudocode6, is described below, and which illustrates memory-efficient cluster generation using SAH:

```
float PagedSahCost(SPLIT_PLANE S) {
    AABB Box = Union(S.BoxL, S.BoxR); // bounding box for 2
    subsets of primitives
    float r_fArea = 1.0f / Area(Box);
    // Memory Efficent scale is < 1 only for the split positions
    // where we divide evenly into the chunks
    float scale = (S.NL % M) == 0 || (S.NR % M) == 0 ? pageCoeff : 1.0f;
    return scale * (S.NL * (Area(S.BoxL) * r_fArea) + S.NR *
    (Area(S.BoxR) * r_fArea));
}
SPLIT_PLANE findBestSplit(SET primitives) {
    SPLIT_PLANE bestSplit;
    bestSplit.sah = INFINITY;
    // search for the best split in all 3 dimensions
    for(dimension = {X, Y, Z}) {
        for(all primitives)
            Keys[i] = primitives[i].center[dimension];
        sort(Keys, primitives); // sort primitives by keys = centroids
        for( split_i = [1..primitives.numElems) ) {
            SPLIT_PLANE S;
            S.dimension = dimension;
            S.BoxL = AABB(Union(all primitives in [0 .. i) ));
            S.BoxR = AABB(Union(all primitives in
            [i .. primitives.numElems) ));
            S.NL = i;
            S.NR = primitives.numElems − i;
            S.sah = PagedSahCost(S);
            if(S.sah < bestSplit.sah) bestSplit = S;
        }
    }
    return bestSplit;
}
void makeSplit(SPLIT_PLANE split, SET primitives, SET primitivesL,
SET primitivesR) {
    // sort along dimension of selected split position
    for(all primitives)
        Keys[i] = primitives[i].center[split.dimension];
    sort(Keys, primitives); // sort by keys = centroids
    // divide the set of primitives into two subsets
    primitivesL = all primitives in [0 .. split.NL);
    primitivesR = all primitives in [split.NL .. primitives.numElems);
}
void generate_clusters(SET clusters, SET primitives)
{
    // stop subdivision if the number of primitives is not larger than M
    if(primitives.numElems <= M) {
        elem = primitives;
        add_elem_into_set(clusters, elem);
        return;
    }
    SPLIT_PLANE split = findBestSplit(primitives);
    SET primitivesL, primitivesR;
    makeSplit(split, primitives, primitivesL, primitivesR);
    generate_clusters(clusters, primitivesL);
    generate_clusters(clusters, primitivesR);
}
// generate the clusters of the primitives
clusters = empty;
generate_clusters(clusters, all primitives of the model);
```

Explaining certain features of pseudocode6 below in further detail, if pageCoef=1 in the PagedSahCost function (pseudocode 6), then this build process switches to the SAH-based build of the set of clusters of primitives without memory efficiency. As a result an average cluster has around 0.6*M or up to 0.7*M primitives. For instance, if 99.9999% page memory utilization is desired, then pageCoef should be set to 0.0001 (an example value close to zero). In this case, the spatial separation among the AABBs of the clusters may become worse. In one embodiment, an optimal cluster generation uses pageCoef=0.5 and M=1000 (i.e., the clusters allowed to contain up to 1000 primitives). In this case average cluster contains around 0.9*M or up to 0.97*M primitives, at the same time the AABBs of resulting clusters are spatially well separated from each other.

Figure 13:
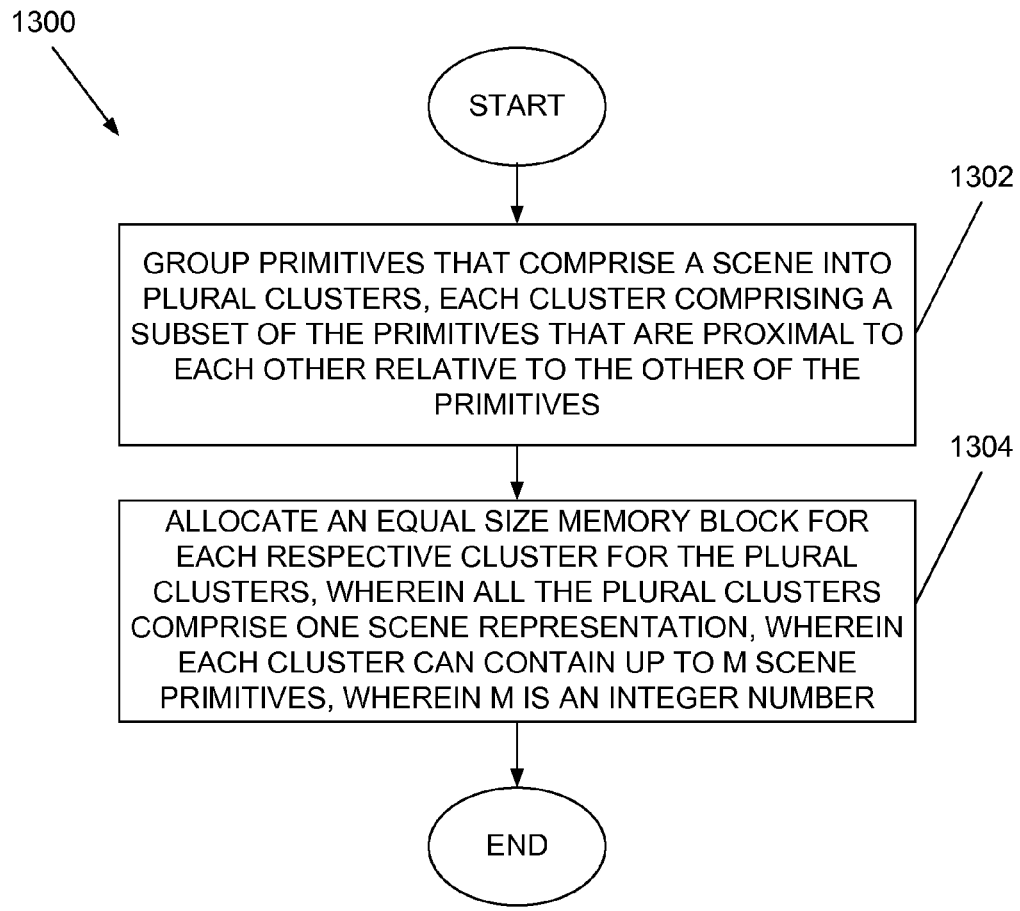
FIG. 13 is a flow diagram that illustrates one example graphics processing method embodiment.

In view of the description above, it should be appreciated that one method embodiment 1300, depicted in FIG. 13, comprises: grouping by a processor primitives that comprise a scene into plural clusters, each cluster comprising a subset of the primitives that are proximal to each other relative to the other of the primitives (1302); and allocating an equal size memory block for each respective cluster for the plural clusters, wherein all the plural clusters comprise one scene representation, wherein each cluster can contain up to M scene primitives, wherein M is an integer number (1304). In some embodiments, allocating a memory block comprises reserving M equal memory slots to store each of M primitives. A single primitive can be stored in a single slot. For each cluster, there is an allocating of the memory for exactly M slots (hence, equal size memory blocks), where one primitive may be stored in one slot. In the course of spatial grouping, the primitives may be arranged into the clusters and placed inside the slots. Some slots may be empty (without a primitive). Empty slots determine underutilization of the memory block allocated per cluster.

In some embodiments, one goal is to subdivide the set of primitives (a scene) into several clusters. Each cluster has memory allocation where M primitives can be stored. But after spatial grouping of the set of primitives, M-p primitives can be stored in the first M-p slots of memory block for some cluster, the other p slots are empty (they store nothing, but the memory for them was allocated and it is wasted). In general, a goal is to minimize p for all the clusters (on average). Inside each cluster the primitives are proximal to each other. One goal is to utilize the memory of each cluster (i.e. each slot should be non-empty, if possible, i.e. store a primitive) and have proximal primitives inside the cluster. Hence, a feature of certain embodiments is to have good grouping into clusters of proximal primitives and at the same time have groups of equal memory blocks. In other words, an average p close to zero is good. With equal memory blocks (and at the same time retaining proximity among the primitives) per cluster, it is much better for GPU processing.

In some embodiments, after grouping a set of primitives, each cluster contains M-p primitives in the first M-p cluster memory slots, the other p slots of the cluster remain empty. The average value of p among all the clusters approaches zero. In the case of p=0, the cluster has a maximum memory utilization (e.g., 95% as one illustrative example). For instance, average(p)=0 determines an ideal memory utilization for each cluster. Note that in some embodiments, average (p)>0 may be the case because of unpredicted spatial distribution of the primitives, but still it aims to be close to 0. For the given set of primitives of the scene the number of generated clusters is lower if the value of average(p) approaches zero; and the number of clusters is larger for larger value of average(p). Memory is saved more efficiently in the case of smaller average(p).

It is a complex problem to overcome—i.e., to build the set of clusters where all containing primitives are proximate enough and at the same time have almost M primitives. Certain embodiments disclosed herein provide a Surface Area Heuristic (good proximity grouping) modified with Memory Efficient Heuristic and where all the clusters have, for instance, the average of 0.95 M primitives (almost M)—this allows a utilization of memory allocation for any cluster to be much better.

In some embodiments, the grouping of the primitives further comprises maximizing a density of the primitives within a cluster bounding volume (the density is higher when more primitives are stored inside the cluster and the spatial bounding volume of all these cluster primitives is smaller).

In some embodiments, the grouping is based on a surface area heuristic modified with modulo operation (modulo operation extracts a remainder from division). It is noted that a modulo operation is used here (e.g. 9% 4=1 where '%' is a modulo operation)—which extracts a remainder from integer division of a on b (c=a % b, i.e. b*n+c=a where a, b, c and n are integer numbers). A modified surface area heuristic is used to generate the clusters with a maximized density of primitives per a cluster bounding volume and a maximized memory utilization per the cluster's allocated block.

In some embodiments, additional features include determining whether the scene can be entirely stored in a processor memory in a given interval of time; responsive to determining the scene is too large for the processor memory, segmenting by the processor the scene into plural chunks of primitives, where each chunk fits in processor memory; and grouping each chunk of primitives into the plural clusters.

In some embodiments, additional features include constructing a bottom-level spatial index for each of the clusters of all of the chunks, representing each cluster with a single bounding volume. Some embodiments further comprise storing the bottom-level spatial index in a second memory distinct and separate from the processor memory, wherein the second memory comprises an external memory capable of storing all the bottom-level spatial indices (a memory where the full scene is stored).

In some embodiments, the additional features may include constructing a top-level spatial index over all the bounding volumes, which represent all of the clusters of primitives of all of the scene objects, wherein each leaf of the top-level spatial index references the bottom-level spatial index of the single cluster. Some embodiments further include storing the top-level spatial index in the memory, wherein the memory comprises a GPU main memory.

Figure 14:
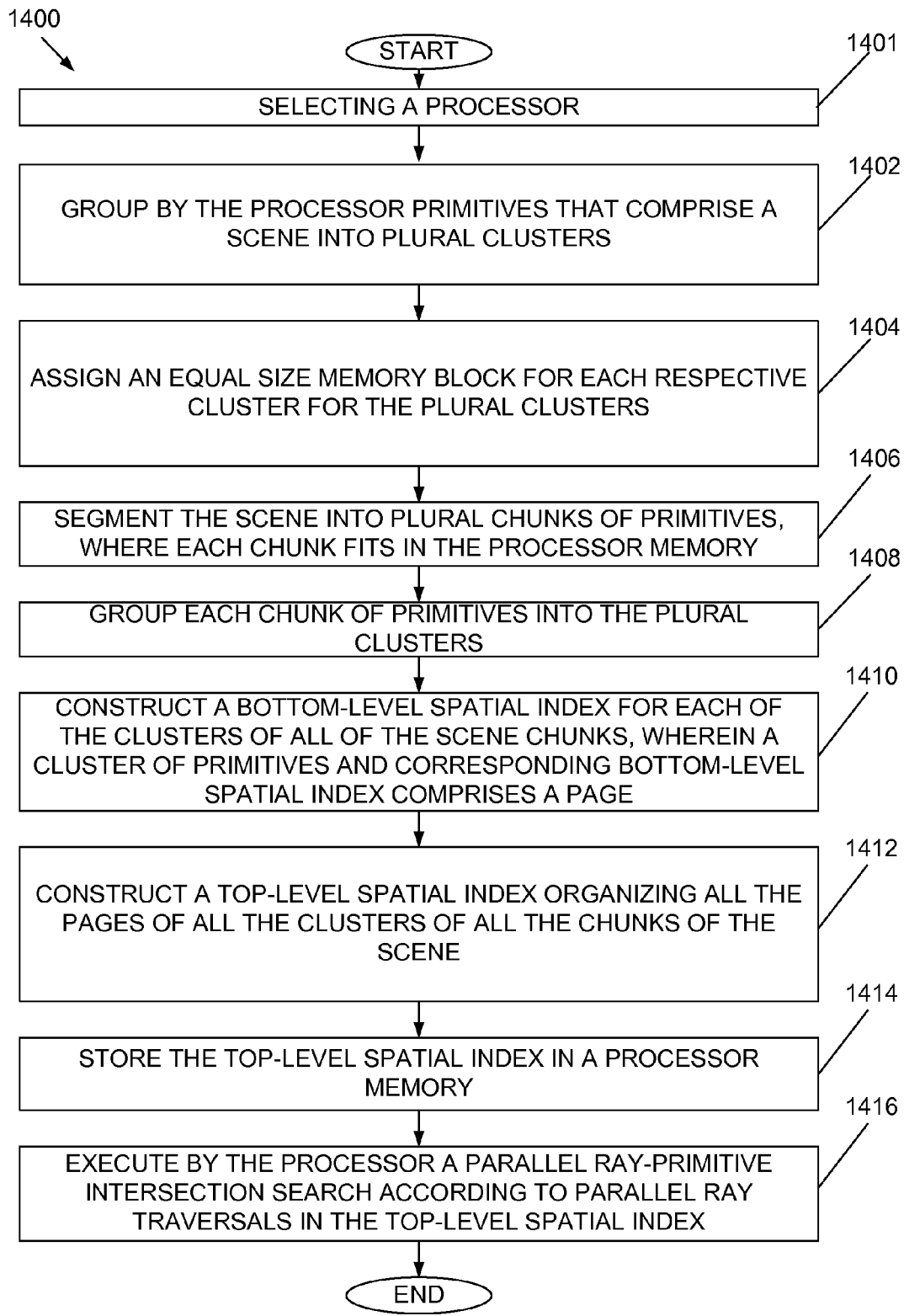
FIG. 14 is a flow diagram that illustrates another example graphics processing method embodiment.

It should be appreciated, in view of the above description, that another method embodiment 1400, depicted in FIG. 14, comprises selecting a processor, wherein the selected processor comprises a host processor or a graphics processing unit (GPU) (1401); grouping by the processor primitives that comprise a scene into plural clusters, each cluster comprising a subset of the primitives that are spatially proximal to each other relative to the other of the primitives (1402); assigning an equal size memory block for each respective cluster for the plural clusters, wherein all the plural clusters comprise one scene representation, wherein each cluster contains up to M primitives, where M is an integer number, wherein assigning the equal size memory block to each cluster corresponds to allocating an equal size region configured to store data (e.g., primitives, etc.) of the cluster in a memory of the processor or storage device where a cluster presence is used (1404); segmenting by the processor the scene into plural chunks of the primitives, where each chunk fits in the processor memory (1406); grouping by the processor each chunk of the primitives into the plural clusters (1408); constructing by the processor a bottom-level spatial index for each of the plural clusters of all of the scene chunks, wherein a cluster of the primitives and a corresponding bottom-level spatial index comprises a page (1410); constructing by the processor a top-level spatial index organizing all the pages of all the clusters of all the chunks of the scene, wherein each page is represented with a bounding volume during the construction process, wherein each leaf node of the top-level spatial index references to an associated page (1412); storing the top-level spatial index in the processor memory (1414); and executing by the processor a parallel ray-primitive intersection search according to parallel ray traversals in the top-level spatial index (1416).

In some embodiments, additional features include organizing the 3-level caching storage of the pages: cache level 3 (storage)—all the pages of the scene are stored in external memory (disc); cache level 2 (host processor memory cache)—the portion of pages from level 3 is stored in the cache allocated in the host processor memory; cache level 1 (GPU cache)—the portion of pages from level 2 is stored in the cache allocated in the GPU memory; the pages which are stored in level 1 memory in a given interval of time are referred to as in-core pages, the other pages referred to as out-of-core pages; keeping the information for all the pages in a page table (for each page this information includes the page address and page presence in each of the 3 cache levels, "WasRead" flag and "UsedCounter" counter). In other words, the basis behind this embodiment is that GPU memory is very small; the host processor physical memory is much larger but is also limited; the disc memory can be considered as large enough for storing the whole scene (scene of primitives is subdivided into chunks of primitives (trivial subdivision), chunks subdivided into clusters (non-trivial, uses proximity of primitives to each other), for each cluster a bottom-level spatial index is constructed, a cluster and corresponding bottom-level spatial index determines a page).

In some embodiments, additional features for the embodiments described immediately above include wherein the parallel ray-primitive intersection search by the GPU comprises 3 stages: "Setup stage": for each page setting WasRead flag to zero and UsedCounter to zero; "GPU ray traversal stage": ray primitive intersection searching and requesting for out-of-core pages using parallel ray-traversal by the GPU through the top-level spatial index; "Page replacement stage": transferring missed pages requested by "GPU ray traversal stage" to the level 1 GPU cache; and repeating "GPU ray traversal stage" followed by "page replacement stage" until no more pages are requested. It is noted that each ray primitive intersection search corresponds to ray traversal through the top-level spatial index with a modified test for intersection between the ray and a leaf node of the top-level spatial index. In some embodiments, additional features include wherein each event of intersection between the ray and the top-level leaf node (which references to in-core page which has WasRead flag equal to zero) further comprises: incrementing by one the UsedCounter of this page with atomic instruction and hence searching for ray primitive intersection inside this page. In some embodiments, additional features include wherein each event of intersection between the ray and the top-level leaf node (which references to out-of-core page which has WasRead flag equal to zero) further comprises: incrementing by one the UsedCounter of this page with atomic instruction if the number of previously intersected out-of-core pages by the ray is less than k, wherein the event of incrementing the UsedCounter for an out-of-core page corresponds to a request for a missed page. In other words, the rays are tested for intersection in parallel by a GPU. When any ray primitive intersection search process encounters some node (inner node or leaf node) of the spatial index and if the process should increment some node counter, then atomic addition is used to ensure that this addition is executed for the given number of the processes (which are executed in parallel) requiring an access to this node. Note that 'k'=any integer non-zero number. 'k' is typically used to be greater or equal to 1, but referred to as 'k' for broadness. Note that in some embodiments, k may be a small integer value (e.g., 1, 3, 20, etc.) that varies depending on ray intersection search conditions. For instance, when there are many active rays (e.g., rays searching for an intersection), k is small (e.g., 1-3 for all of them). When the number of active rays is small, then k may be a larger value (e.g., 10-20).

In some embodiments, additional features may include performing a page replacement, wherein performing a page replacement comprises: updating page presence and address information in the page table; transferring the pages from the cache level c+1 which have the highest non-zero value of UsedCounter in place of pages from the cache level c which have the lowest value of UsedCounter, where 'c'=1 or 2.

In some embodiments, additional features may include wherein prior to page replacement the page table is updated by the GPU, wherein a page table update comprises: setting WasRead flag of each in-core page to one; sorting the IDs of pages which are placed in the GPU cache (level 1) using the page UsedCounters as keys; sorting the IDs of pages which are placed in the host processor cache (level 2) using the page UsedCounters as keys; sorting the IDs of pages which are placed in external memory (level 3) using the page UsedCounters as keys; swapping the page IDs from the cache level c+1 which have the highest non-zero value of UsedCounter with the page IDs from the cache level c which have the lowest value of UsedCounter; where 'c'=1 or 2; constructing the arrays of source page IDs and destination page addresses which are further used to determine the transfer order of page contents from cache level c+1 to the cache level c. In some embodiments, additional features may include wherein followed by the page replacement, UsedCounter of each page is set to zero. In some embodiments, additional features may include mapping the memory region allocated for the level 2 (the region of the host processor memory) to an address space of the GPU memory. For instance, the mapped memory may correspond to pinned mapped memory. In some embodiments, the additional features may include wherein a transfer of memory contents of the pages from cache level 2 to the GPU cache (level 1) is organized based on a read of the memory contents mapped to the GPU memory and storage of the contents in the GPU cache.

One or more embodiments of the graphics processing systems and methods described herein may be implemented in hardware, software, firmware, or a combination thereof. When implemented at least in part in software or firmware, one or more embodiments of graphics processing systems may be implemented in software or firmware that is stored in a memory and that is executed by a suitable instruction execution system. When implemented at least in part in hardware, one or more embodiments of graphics processing systems may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The software functionality of certain embodiments of graphics processing systems may comprise an ordered listing of executable instructions for implementing logical functions, and may be embodied in any non-transitory computer-readable medium for use by or in connection with an instruction execution system, apparatus, or device, such as a computer-based system, processor-containing system, or other system that can fetch the instructions from the instruction execution system, apparatus, or device and execute the instructions.

Any process descriptions or blocks in flow diagrams should be understood as representing modules, segments, or portions of code which include one or more executable instructions for implementing specific logical functions or steps in the process, and alternate implementations are included within the scope of the certain embodiments of the present disclosure in which functions may be executed out of order from that shown or discussed, including substantially concurrently or in reverse order, depending on the functionality involved, as would be understood by those reasonably skilled in the art.

These embodiments, and their relative dependency, are at least partially represented by the accompanying claims. It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method, comprising:
grouping primitives that comprise a scene into plural pages, wherein each page comprises a subset of the scene primitives and an internal spatial index organizing the primitives of the page;
organizing the pages of the scene within a top-level spatial index, wherein at least a portion of the leaf nodes of the top-level spatial index have references to one or more of the pages;
organizing a multi-level caching storage system of the pages, including an optional cache level 3, wherein all of the pages of the scene are stored in external memory configured to store the data of all the pages, a cache level 2, allocated in a region of a host processor memory, wherein at least a portion of the pages from the cache level 3 is stored, and a cache level 1, allocated in a region of a graphics processing unit (GPU) memory, wherein at least a portion of the pages from the cache level 2 is stored, wherein an in-core page is one of the pages that is stored in the cache level 1 and an out-of-core page is one of the pages that is not stored in the cache level 1;
maintaining information for the pages in at least one page table, wherein the information for each page comprises at least a counter indicating whether there are any available access requests for this page and an optional WasRead flag indicating whether this page was or was not previously tested for intersection; and
performing a ray-primitive intersection search upon request to find intersections between rays and scene primitives using at least the top-level spatial index, the caching storage system and the page table.

2. The method of claim 1, further comprising:
determining whether all of the pages of the scene can be entirely stored in the cache level 2; and
optionally excluding any use of the cache level 3 and organizing the storage of all of the scene pages in the cache level 2 if all of the scene pages are able to be stored in the cache level 2.

3. The method of claim 1, wherein performing the ray-primitive intersection search comprises performing a page setup stage, a ray traversal stage, and a page replacement stage, further comprising repeating the ray traversal stage followed by the page replacement stage until no more pages are requested.

4. The method of claim 3, wherein the page setup stage comprises:
setting for each of the scene pages the counter of access requests to zero; and
if the WasRead flag is used, setting for each of the scene pages the WasRead flag indicating that page was not previously tested for intersection.

5. The method of claim 3, wherein the ray traversal stage is performed by the GPU by performing ray traversal for rays in parallel through the top-level spatial index with a modified test for intersection between a ray and a leaf node of the top-level spatial index.

6. The method of claim 5, further comprising one or more additional GPUs which perform ray traversal, wherein a memory for each of the one or more additional GPUs comprises a cache level 1 arranging the pages accessible by the associated GPU.

7. The method of claim 5, wherein each event of intersection between the ray and the top-level leaf node, which references to an in-core page, further comprises searching for a ray primitive intersection inside an encountered page.

8. The method of claim 7, wherein searching for a ray primitive intersection inside an encountered in-core page is performed only if the WasRead flag indicates that this page was not previously tested for intersection.

9. The method of claim 7, further comprising accumulating the counter of access requests of an encountered in-core page.

10. The method of claim 5, wherein each event of intersection between the ray and the top-level leaf node, which references to an out-of-core page, further comprises:
accumulating the counter of access requests of an encountered out-of-core page if nc is less than k, wherein the event of accumulating the counter of access requests for the out-of-core page corresponds to a request for missed page by the ray, wherein k is an integer value and nc is a number of the out-of-core pages previously requested by the ray.

11. The method of claim 10, wherein accumulating the counter of access requests of an encountered out-of-core page is performed only if the WasRead flag indicates that this page was not previously tested for intersection.

12. The method of claim 10, wherein in case of nc is equal or larger than k the ray traversal through the top-level spatial index is continued searching for ray-primitive intersection inside in-core pages which are referenced within the top-level spatial index.

13. The method of claim 3, wherein the page replacement stage comprises:
updating the page table; and
primarily transferring the pages from a cache level c+1 which have more access requests in place of pages to be evicted from a cache level c, where c equals 1 or 2.

14. The method of claim 13, wherein the cache eviction further comprises selecting the pages with less access requests to be evicted primarily.

15. The method of claim 13, wherein transferring the pages is performed by excluding from the list of pages to be transferred from the cache level c+1 all those pages which have the WasRead flag indicating that they were previously tested for intersection, where c equals 1 or 2.

16. The method of claim 13, wherein updating the page table comprises setting for each page that is currently in-core the WasRead flag indicating that this page was previously tested for intersection.

17. The method of claim 13, wherein updating the page table comprises:
optionally sorting identifiers of the pages which are placed in the cache level 1 using the sorting keys based on the counters of page access requests;
sorting identifiers of the pages which are placed in the cache level 2 using the sorting keys based on the counters of page access requests;
if the cache level 3 is used, sorting identifiers of the pages which are placed in the cache level 3 using the sorting keys based on the counters of page access requests;
selecting the set of page identifiers from the cache level c+1 which have more access requests and selecting the set of page identifiers from the cache level c to be evicted;
swapping the sets selected in cache level c+1 and cache level c; and
constructing arrays of source and destination page identifiers which are further used to transfer page data referenced by page identifiers from the cache level c+1 to the cache level c, where c equals 1 or 2.

18. The method of claim 13, further comprising setting the counter of access requests of each page to zero subsequent to the transferring of the pages.

19. The method of claim 13, further comprising mapping the cache level 2 to an address space of the GPU memory, wherein the mapped cache level 2 corresponds to pinned mapped memory.

20. The method of claim 13, wherein a transfer of page data from the cache level 2 to the cache level 1 is organized based on a block-contiguous read by the GPU of the region of the cache level 2 mapped to the GPU address space, wherein a block-contiguous read corresponds to accessing several blocks of data wherein accessing within the scope of each block is contiguous.

21. A method, comprising:
grouping primitives that comprise a scene into plural pages, wherein each page comprises a subset of the scene primitives and a spatial index organizing the primitives of the page;
organizing all the pages of the scene within a top-level spatial index, wherein at least a portion of the leaf nodes of the top-level spatial index have references to one or more of the pages;
organizing a multi-level caching storage system of the pages, including a cache level 2, allocated in a region of a host processor memory, wherein all of the scene pages are stored or virtually stored, and a cache level 1, allocated in a region of a (graphics processing unit) GPU memory, wherein at least a portion of the pages from the cache level 2 is stored, wherein an in-core page is one of the pages that is stored in the cache level 1 and an out-of-core page is one of the pages that is not stored in the cache level 1;
maintaining information for the pages in at least one page table, wherein the information for each page comprises at least a counter indicating whether there are any available access requests for this page and an optional WasRead flag indicating whether this page was or was not previously tested for intersection; and
performing a ray-primitive intersection search upon request to find intersections between rays and scene primitives, wherein the ray-primitive intersection search further comprises at least:
performing a ray traversal stage by the GPU using at least the top-level spatial index, the cache level 1, the page table and page requesting; and
performing a page replacement stage comprising delivery of requested pages to the cache level 1.

22. The method of claim 21, further comprising:
performing a page setup stage prior to performing the ray traversal stage, wherein performing the page setup stage comprises:
setting for each of the scene pages the counter of access requests to zero;
if the WasRead flag is used, setting for each of the scene pages the WasRead flag indicating that this page was not previously tested for intersection; and
repeating the ray traversal stage followed by the page replacement stage until no more pages are requested in the ray traversal stage.

23. The method of claim 21, wherein the ray traversal stage is performed by the GPU by performing ray traversal for rays in parallel through the top-level spatial index with a modified test for intersection between a ray and a leaf node of the top-level spatial index, wherein:
each event of intersection between the ray and the top-level leaf node, which references to an in-core page, further comprises searching for a ray primitive intersection inside an encountered page; and
each event of intersection between the ray and the top-level leaf node, which references to an out-of-core page, further comprises: accumulating the counter of access requests of an encountered out-of-core page if nc is less than k, wherein the event of accumulating the counter of access requests for the out-of-core page corresponds to a request for missed page by the ray, wherein k is an integer value and nc is a number of the out-of-core pages previously requested by the ray.

24. The method of claim 21, wherein the page replacement stage comprises:
if the WasRead flag is used, setting for each page that is currently in-core the WasRead flag indicating that this page was previously tested for intersection;
primarily transferring the pages from the cache level 2 which have more access requests in place of pages to be evicted from the cache level 1, wherein the pages which have the WasRead flag indicating that these pages were previously tested for intersection are excluded from the list of pages to be transferred from the cache level 2; and
setting the counter of access requests of each out-of-core page to zero subsequent to the transferring of the pages.

25. A method, comprising:
grouping primitives that comprise a scene into plural pages, wherein each page comprises a subset of the scene primitives and an optional internal spatial index organizing the primitives of the page;
organizing a multi-level caching storage of the pages, including at least: a cache level 2, wherein all of the scene pages are virtually stored; and a cache level 1, allocated in a region of a (graphics processing unit) GPU memory, wherein at least a portion of the pages from the cache level 2 is temporarily stored; and
performing a ray-primitive intersection search upon request to find intersections between rays and scene primitives, wherein the ray-primitive intersection search further comprises at least:
performing a ray traversal stage by the GPU comprising searching for ray-primitive intersections within the pages stored in the cache level 1 and requesting for pages that are not currently stored in the cache level 1; and
performing a page replacement stage comprising delivery of requested pages to the cache level 1.

* * * * *